United States Patent
Cao et al.

(10) Patent No.: US 12,502,362 B2
(45) Date of Patent: Dec. 23, 2025

(54) INHIBITORS OF NUCLEOTIDYLTRANSFERASE SUPERFAMILY ENZYMES AS ANTIBIOTICS

(71) Applicants: Saint Louis University, St. Louis, MO (US); United States Government as Represented by the Department of Veterans Affairs, Washington, DC (US); The Research Foundation of the City University of New York, New York, NY (US)

(72) Inventors: Feng Cao, Olivette, MO (US); John E. Tavis, Kirkwood, MO (US); Maureen J. Donlin, Kirkwood, MO (US); Marvin J. Meyers, Wentzville, MO (US); Ryan P. Murelli, Belleville, NJ (US); Cari Orth, St. Louis, MO (US); Bahaa Elgendy, St. Louis, MO (US)

(73) Assignees: Saint Louis University, St. Louis, MO (US); United States Government as Represented by the Department of Veterans Affairs, Washington, DC (US); Research Foundation of the City University of New York, New York, NY (US)

( * ) Notice: Subject to any disclaimer, the term of this patent is extended or adjusted under 35 U.S.C. 154(b) by 0 days.

(21) Appl. No.: 16/614,335

(22) PCT Filed: May 16, 2018

(86) PCT No.: PCT/US2018/032869
§ 371 (c)(1),
(2) Date: Nov. 15, 2019

(87) PCT Pub. No.: WO2018/213378
PCT Pub. Date: Nov. 22, 2018

(65) Prior Publication Data
US 2020/0147086 A1     May 14, 2020

Related U.S. Application Data

(60) Provisional application No. 62/507,551, filed on May 17, 2017.

(51) Int. Cl.
*A61P 31/04* (2006.01)
*A61K 31/122* (2006.01)
(Continued)

(52) U.S. Cl.
CPC .......... *A61K 31/122* (2013.01); *A61K 31/235* (2013.01); *A61K 31/255* (2013.01); *A61K 31/496* (2013.01); *A61P 31/04* (2018.01)

(58) Field of Classification Search
CPC .......... A61P 31/04; A61P 31/06; A61P 31/08; A61K 31/122; A61K 31/235; A61K 31/255; A61K 31/381
See application file for complete search history.

(56) References Cited

U.S. PATENT DOCUMENTS 3,391,133 A * 7/1968 Donaruma .............. C07C 69/54
                                                  534/885
4,129,737 A   12/1978 Pesson
(Continued)

FOREIGN PATENT DOCUMENTS

DE    3149608 A1 * 8/1983
EP    0267378 A2 * 5/1988
(Continued)

OTHER PUBLICATIONS

JP407053360A. Machine Translation. (Year: 1995).*
(Continued)

*Primary Examiner* — James H Alstrum-Acevedo
*Assistant Examiner* — Chris E Simmons
(74) *Attorney, Agent, or Firm* — pH IP LAW

(57) ABSTRACT

In one aspect, the present disclosure provides methods of treating a bacterial infection using an inhibitor of the nucleotidyltransferase superfamily enzyme. In some embodiments, the compounds have one of the following formulas (I), (II), (III), or (IV) wherein $R_1$, $R_2$, and $R_3$ are as defined herein or a pharmaceutically acceptable salt thereof. The compounds may be used to treat a bacterial infection including an infection of *Enterococcus faecium, Staphylococcus aureus, Klebsiella pneumoniae, Acinetobacter baumannii, Pseudomonas aeruginosa*, and *Enterobacter* species.

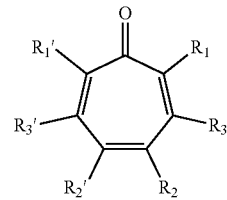

(I)

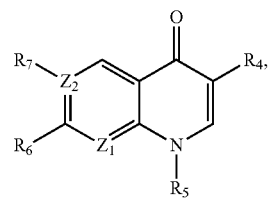

(II)

(III)

, or (Continued)

-continued

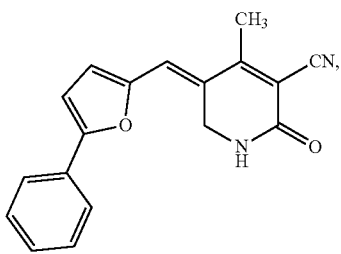

(IV)

12 Claims, 1 Drawing Sheet

(51) Int. Cl.
| | |
|---|---|
| A61K 31/235 | (2006.01) |
| A61K 31/255 | (2006.01) |
| A61K 31/496 | (2006.01) |
| A61P 31/06 | (2006.01) |
| A61P 31/08 | (2006.01) |

(56) References Cited

U.S. PATENT DOCUMENTS

| | | | | |
|---|---|---|---|---|
| 2007/0219141 | A1* | 9/2007 | Jones | A61K 36/14 |
| | | | | 568/375 |
| 2009/0062337 | A1 | 3/2009 | Schwan et al. | |
| 2015/0094327 | A1 | 4/2015 | Bushman et al. | |
| 2015/0216773 | A1* | 8/2015 | Konate | A61Q 19/00 |
| | | | | 514/675 |

FOREIGN PATENT DOCUMENTS

| | | | |
|---|---|---|---|
| JP | 407053360 A | * | 2/1995 |
| JP | 2002047145 A | * | 2/2002 |

OTHER PUBLICATIONS

Oloyede et al. ("Toxicity, antimicrobial and antioxidant activities of methyl salicylate dominated essential oils of Laportea aestuans (Gaud)." Arabian Journal of Chemistry; 9, S840-S845. Available online Sep. 20, 2011). (Year: 2011).*
Bruesewitz et al. (DE 3149608 A1). Aug. 4, 1983. English translation. (Year: 1983).*
Asahi Kasei Corp. (2002) (JP2002047145A). Machine translation. (Year: 2002).*
Sanders, H. D. ((1961). "Some pharmacological and microbiological studies on beta-hydroxy thujaplicin." University of British Columbia. Retrieved from https://open.library.ubc.ca/collections/ubctheses/831/items/1.0106018. (Year: 1961).*
Zondervan et al. ("Exploring the adaptability and robustness of the central carbon metabolism of Mycoplasma pneumoniae." Cold Spring Harbor Laboratory; bioRxiv (2022). 08.08.503180; doi: https://doi.org/10.1101/2022.08.08.503180). (Year: 2022).*
New York State Department of Health ("Mycoplasma Infection (walking pneumonia, atypical pneumonia)." New York State Department of Health (2011); https://www.health.ny.gov/diseases/communicable/mycoplasma/fact_sheet.htm. 3 pages.) (Year: 2011).*
Arima Y, Nakai Y, Hayakawa R, Nishino T. 2003. "Antibacterial effect of beta-thujaplicin on Staphylococci isolated from atopic dermatitis: relationship between changes in the number of viable bacterial cells and clinical improvement in an eczematous lesion of atopic dermatitis" J Antimicrob Chemother. Jan. 51(1):113-22.
Ariyoshi M, Vassylyev DG, Iwasaki H, Nakamura H, Shinagawa H, et al. 1994."Atomic structure of the RuvC resolvase: a holliday junction-specific endonuclease from E. coli." Cell 78: 1063-1072.

Bassetti M and Righi E. 2015. Development of novel antibacterial drugs to combat multiple resistant organisms. Langenbecks Arch Surg. 400:153-165.
Beilhartz GL, Wendeler M, Baichoo N, Rausch J, Grice SL, Gotte M. 2009."HIV-1 reverse transcriptase can simultaneously engage its DNA/RNA substrate at both DNA polymerase and RNase H active sites: implications for RNase H inhibition" J. Mol. Biol. 388: 462-474.
Boucher HW, Talbot GH, Bradley JS, et al. 2009. Bad Bugs, No Drugs: No. ESKAPE! an update from the Infectious Diseases Society of America. Clin Infect Dis. 48:1-12.
Cai CW, Lomonosova E, Moran EA, Cheng X, Patel KB, Bailly F, Cotelle P, Meyers MJ, Tavis JE. 2014. "Hepatitis B virus replication is blocked by a 2- hydroxyisoquinoline-1,3(2H,4H)-dione (HID) inhibitor of the viral ribonuclease H activity" Antiviral Res. 108:48-55.
Clinical and Laboratory Standards Institute. 2015. "Methods for dilution antimicrobial susceptibility tests for bacteria that grow aerobically; approved standard—tenth edition" M07-A10. Wayne, PA.
Davies DR, Goryshin IY, Reznikoff WS, Rayment I. 2000. "Three-dimensional structure of the Tn5 synaptic complex transposition intermediate" Science 289:77-85.
Dyda F, Hickman AB, Jenkins TM, Engelman A, Craigie R, et al. 1994. Crystal structure of the catalytic domain of HIV-1 integrase: similarity to other polynucleotidyl transferases. Science 266: 1981-1986.
Farias RV, Vargas DA, Castillo AE, Valenzuela B, Cote ML, Roth MJ, Leon O. 2011. Expression of an Mg2+-dependent HIV-1 RNase H construct for drug screening. Antimicrob. Agents Chemother. 55: 4735-4741.
Fotopoulou T, Cirić A, Kritsi E, Calhelha RC, Ferreira IC, Soković M, Zoumpoulakis P, Koufaki M. 2016. Antimicrobial/Antibiofilm Activity and Cytotoxic Studies of ß-Thujaplicin Derivatives. Arch Pharm (Weinheim). Sep;349(9):698-709.
Hu Y, Cheng X, Cao F, Huang A, Tavis JE. 2013. Thujaplicinol inhibits hepatitis B virus replication by blocking the viral ribonuclease H activity. Antiviral Res. 99:221-229.
Infectious Diseases Society of A (2010) The 10 x '20 initiative: pursuing a global commitment to develop 10 new antibacterial drugs by 2020. Clin Infect Dis. 50:1081-1083, 2020.
PCT International Preliminary Report on Patentability in International Application No. PCT/US18/32869, mailed Nov. 28, 2019.
PCT International Search Report and Written Opinion in International Application No. PCT/US18/32869, mailed Jul. 11, 2018.
Katayanagi K, Miyagawa M, Matsushima M, Ishikawa M, Kanaya S, et al. 1990. Three-dimensional structure of ribonuclease H from E. coli. Nature 347: 306-309.
Lima WF, Wu H, Crooke ST. 2001. Human RNases H. Methods Enzymol., 341, pp. 430-440.
Lomonosova E, Zlotnick A, Tavis JE. 2016. Synergistic Interactions between Hepatitis B Virus Ribonuclease H Antagonists and Other Inhibitors. Antimicrob Agents Chemother. Dec. 12. pii: AAC.02441-16.
Lu G, Lomonosova E, Cheng X, Moran EA, Meyers MJ, Le Grice SF, Thomas CJ, Jiang JK, Meck C, Hirsch DR, D'Erasmo MP, Suyabatmaz DM, Murelli RP, Tavis JE. 2014. Hydroxylated tropolones inhibit hepatitis B virus replication by blocking viral ribonuclease H activity. Antimicrob Agents Chemother. Dec.; 58(12):7451-61.
Morita Y, Matsumura E, Okabe T, Fukui T, Shibata M, Sugiura M, Ohe T, Tsujibo H, Ishida N, Inamori Y. 2004. Biological activity of alpha-thujaplicin, the isomer of hinokitiol. Biol Pharm BullJun. ;27(6):899-902.
Morita Y, Matsumura E, Tsujibo H, Yasuda M, Sakagami Y, Okabe T, Ishida N, Inamori Y. 2001. Biogical activity of alpha-thujaplicin, the minor component of Thujopsis dolabrata SIEB. et ZUCC. var. hondai MAKINO.Biol Pharm Bull. Jun.;24(6):607-11.
Morita Y, Matsumura E, Okabe T, Fukui T, Ohe T, Ishida N, Inamori Y. 2004. Biological activity of beta-dolabrin, gamma-thujaplicin, and 4-acetyltropolone, hinokitiol-related compounds. Biol Pharm Bull. Oct.;27(10):1666-9.
National action plan for combating antibiotic-resistant bacteria. Centers for Disease Control and Prevention (CDC) Web site.

(56) References Cited

OTHER PUBLICATIONS https://www.whitehouse.gov/sites/default/files/docs/national_action_plan_for_co mbating_antibotic-resistant_bacteria.pdf. Published on Mar. 2015.

Nowotny M. 2009. Retroviral integrase superfamily: the structural perspective. EMBO Rep. 10:144-151.

Rice LB. 2008. Federal funding for the study of antimicrobial resistance in nosocomial pathogens: No ESKAPE. J Infect Dis. 197:1079-81.

Rice PA, Baker TA. 2001. Comparative architecture of transposase and integrase complexes. Nat Struct Biol. 8: 302-307.

Shih YH, Lin DJ, Chang KW, Hsia SM, Ko SY, Lee SY, Hsue SS, Wang TH, Chen YL, Shieh TM. 2014. Evaluation physical characteristics and comparison antimicrobial and anti-inflammation potentials of dental root canal sealers containing hinokitiol in vitro. PLoS One. Jun. 10;9(6):e94941.

Shih YH, Chang KW, Hsia SM, Yu CC, Fuh LJ, Chi TY, Shieh TM. 2013. In vitro antimicrobial and anticancer potential of hinokitiol against oral pathogens and oral cancer cell lines. Microbiol Res. Jun. 12;168(5):254-62.

Song JJ, Smith SK, Hannon GJ, Joshua-Tor L. 2004. Crystal structure of Argonaute and its implications for RISC slicer activity. Science 305: 1434-1437.

Tavis JE, Wang H, Tollefson AE, Ying B, Korom M, Cheng X, Cao F, Davis K, Wold WE, Morrison LA. 2014. Inhibitors of nucleotidyl transferase superfamily enzymes suppress herpes simplex virus replication. Antimicrob. Agents Chemother. 58 pp. 7451-7461.

Tavis JE, Cheng X, Hu Y, Totten M, Cao F, Michailidis E, Aurora R, Meyers MJ, Jacobsen EJ, Parniak MA, Sarafianos SG. 2013. The hepatitis B virus ribonuclease H is sensitive to inhibitors of the human immunode-ficiency virus ribonuclease H and integrase enzymes. PLoS Pathog. 9:e1003125.

Tavis JE and Lomonosova E. 2015. The hepatitis B virus ribonuclease H as a drug target. Antiviral Research 118. 132-138.

Trust TJ, Bartlett KH. 1975. Antibacterial activity of tropilidine and tropone. Antimicrob Agents Chemother. Sep.;8(3):381-3.

Trust TJ.1975. Antibacterial activity of tropolone. Antimicrob Agents Chemother. May;7(5):500-6.

* cited by examiner

INHIBITORS OF NUCLEOTIDYLTRANSFERASE SUPERFAMILY ENZYMES AS ANTIBIOTICS

PRIORITY INFORMATION

This application is a national phase application under 35 U.S.C. § 371 of International Application No. PCT/US2018/032869, filed May 16, 2018, which claims benefit of priority to U.S. Provisional Application Ser. No. 62/507,551, filed May 17, 2017, the entire contents of each of which are hereby incorporated by reference.

STATEMENT OF FEDERALLY FUNDED RESEARCH

This invention was made with federal government support from the National Institutes of Health Grant No. R01 AI104494 and R01 AI122669. The government has certain rights in the invention.

BACKGROUND

1. Field

This disclosure relates to the fields of medicine, pharmacology, and antimicrobial activity. In particular, the present disclosure relates to new methods of using inhibitors of the nucleotidyltransferase superfamily as antibiotic agents.

2. Related Art

The nucleotidyltransferase superfamily (NTS) comprises numerous important nucleic acid-processing enzymes, including *E. coli* RNaseH I and II (Katayanagi et al., 1990), DNA transposases including the Tn5 transposase (Rice & Baker, 2001), HIV integrase and RNase H (Dyda et al., 1994), the RuvC Holliday junction resolvase (Ariyoshi et al., 1994), the Argonaute RNAse (Song et al., 2004), the hepatitis B virus (HBV) RNase H (Tavis et al., 2013), and human RNaseH 1 and 2 (Lima et al., 2001). NTS enzymes act on various substrates and yet show remarkable mechanistic and structural similarities (Nowotny, 2009). NTS inhibitors have been reported to inhibit on human immunodeficiency virus (HIV) (Beilhartz et al., 2009 and Farias et al., 2011), hepatitis B virus and human simplex virus (HSV) (Tavis et al., 2013; Hu et al., 2013; Cai et al., 2014; Tavis et al., 2014; Lu et al., 2014 and Tavis & Lomonosova, 2015).

The emergence of antimicrobial-resistant bacteria is a rapidly growing concern in public health. The Centers for Disease Control and Prevention (CDC) estimate that drug-resistant bacteria cause two million illnesses and approximately 23,000 deaths each year in the United States alone. There are few candidate drugs in the pipeline that offer benefits over existing drugs and few drugs moving forward that will treat infections due to the so-called "ESKAPE" pathogens (*Enterococcus faecium, Staphylococcus aureus, Klebsiella pneumoniae, Acinetobacter baumannii, Pseudomonas aeruginosa,* and *Enterobacter* species), which cause the majority of US hospital infections and effectively "escape" the effects of approved antibacterial drugs (Boucher et al., 2009; Rice, 2008). For all antibiotics, especially drug-resistant bacterial strains, development of antibiotics which possess different mechanisms of action from common antibiotics are particularly useful for this purpose. Therefore, there remains a need to obtain compounds which possess unique inhibition pathways for treating bacterial infections.

SUMMARY

Thus, the present disclosure provides methods of treating a bacterial infection comprising an inhibitor of the nucleotidyltransferase superfamily enzymes. In some embodiments, the present disclosure provides methods of treating a bacterial infection in a patient comprising administering to the patient a therapeutically effective amount of a compound of the formula:

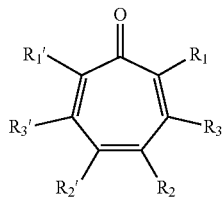

(I)

wherein:
$R_1$ is hydrogen, halo, or a group of the formula:
  —X—$Y_1$, wherein:
    X is O or S;
    $Y_1$ is hydrogen, acyl$_{(C \leq 12)}$, substituted aryl$_{(C \leq 12)}$, arylsulfonyl$_{(C \leq 12)}$, or substituted arylsulfonyl$_{(C \leq 12)}$;
$R_1'$ is hydrogen, hydroxy, or halo;
$R_2$ and $R_2'$ are each independently hydrogen, halo, alkyl$_{(C \leq 6)}$, substituted alkyl$_{(C \leq 6)}$, aryl$_{(C \leq 12)}$, substituted aryl$_{(C \leq 12)}$, —C(O)$R_a$, wherein
  $R_a$ is alkyl$_{(C \leq 12)}$, cycloalkyl$_{(C \leq 12)}$, aryl$_{(C \leq 18)}$, heteroaryl$_{(C \leq 12)}$, or a substituted version of any of these groups;
$R_3$ and $R_3'$ are each independently hydrogen, halo, hydroxy, carboxy, aryl$_{(C \leq 12)}$, or substituted aryl$_{(C \leq 12)}$;
provided that if $R_1$ is —OH then $R_1'$ is not hydrogen or if $R_1'$ is —OH and then
$R_1$ is not hydrogen; or
a compound of the formula:

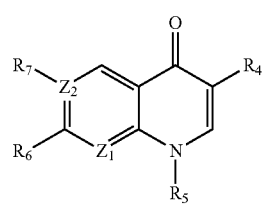

(II)

wherein:
$Z_1$ and $Z_2$ are each independently C or N;
$R_4$ is acyl$_{(C \leq 6)}$, substituted acyl$_{(C \leq 6)}$, or carboxyl;
$R_5$ is alkyl$_{(C \leq 6)}$ or substituted alkyl$_{(C \leq 6)}$, cycloalkyl$_{(C4-C8)}$, or substituted cycloalkyl$_{(C4-C8)}$;
$R_6$ is aryl$_{(C \leq 12)}$, aralkyl$_{(C \leq 12)}$, heterocycloalkyl$_{(C \leq 6)}$, or a substituted version of any of these groups;
$R_7$ is absent, hydrogen, halo, acyl$_{(C \leq 8)}$, or substituted acyl$_{(C \leq 8)}$;
provided that $R_7$ is only absent if $Z_2$ is N; or a compound of the formula:

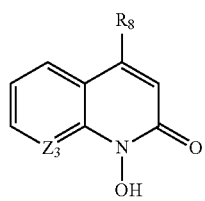

(III)

wherein:
$Z_3$ is either C or N;
$R_8$ is hydrogen, alkyl$_{(C\leq6)}$, substituted alkyl$_{(C\leq6)}$, aryl$_{(C\leq12)}$, substituted aryl$_{(C\leq12)}$, aralkyl$_{(C\leq12)}$, or substituted aralkyl$_{(C\leq12)}$; or
a compound of the formula:

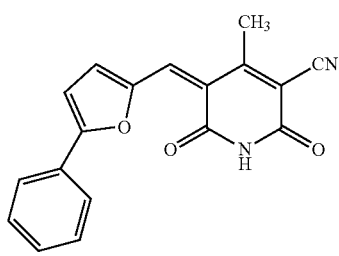

(IV)

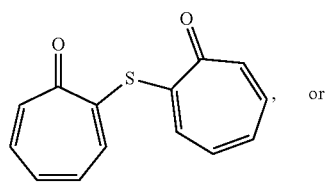

(V)

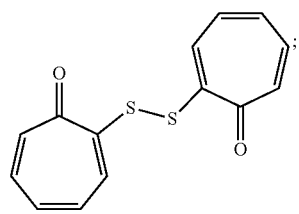

(VI)

or a pharmaceutically acceptable salt thereof.
In some embodiments, the compounds are further defined as:

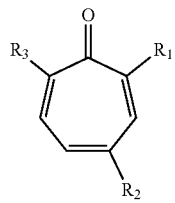

(I)

wherein:
$R_1$ is hydrogen, halo, or a group of the formula:
—X—Y$_1$, wherein:
X is O or S;
$Y_1$ is hydrogen, acyl$_{(C\leq12)}$, or substituted acyl$_{(C\leq12)}$;
$R_2$ is hydrogen, halo, alkyl$_{(C\leq6)}$, substituted alkyl$_{(C\leq6)}$, aryl$_{(C\leq12)}$, or substituted aryl$_{(C\leq12)}$;
$R_3$ is hydrogen, hydroxy, or halo;
provided that if $R_1$ is —OH then $R_3$ is not hydrogen or if $R_3$ is —OH and then $R_1$ is not hydrogen.
In other embodiments, the compounds the compound is further defined as:

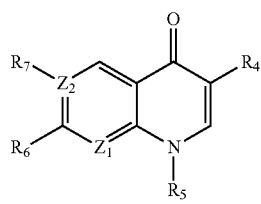

(II)

wherein:
$Z_1$ and $Z_2$ are each independently C or N;
$R_4$ is acyl$_{(C\leq6)}$, substituted acyl$_{(C\leq6)}$, or carboxyl;
$R_5$ is alkyl$_{(C\leq6)}$ or substituted alkyl$_{(C\leq6)}$, cycloalkyl$_{(C4-C8)}$, or substituted cycloalkyl$_{(C4-C8)}$;
$R_6$ is aryl$_{(C\leq12)}$, aralkyl$_{(C\leq12)}$, heterocycloalkyl$_{(C\leq6)}$, or a substituted version of any of these groups;
$R_7$ is absent, hydrogen, or halo;
provided that $R_7$ is only absent if $Z_2$ is N.
In some embodiments, X is O. In some embodiments, $Y_1$ is hydrogen. In other embodiments, $Y_1$ is acyl$_{(C\leq12)}$ or substituted acyl$_{(C\leq12)}$. In some embodiments, $R_2$ is hydrogen. In some embodiments, $R_3$ is hydrogen. In other embodiments, $R_3$ is hydroxy.
In some embodiments, $Z_1$ and $Z_2$ are N. In some embodiments, $R_4$ is carboxyl. In some embodiments, $R_5$ is alkyl$_{(C\leq6)}$ or substituted alkyl$_{(C\leq6)}$. In some embodiments, $R_6$ is heterocycloalkyl$_{(C\leq6)}$ or substituted heterocycloalkyl$_{(C\leq6)}$. In some embodiments, $R_7$ is halo such as fluoro. In other embodiments, $R_7$ is hydrogen.
In some embodiments, $Z_3$ is N. In some embodiments, $R_8$ is hydrogen, alkyl$_{(C\leq6)}$, substituted alkyl$_{(C\leq6)}$, aryl$_{(C\leq12)}$, substituted aryl$_{(C\leq12)}$, aralkyl$_{(C\leq12)}$, or substituted aralkyl$_{(C\leq12)}$.
In some embodiments, $R_8$ is aryl$_{(C\leq12)}$ or substituted aryl$_{(C\leq12)}$. In other embodiments, $Z_3$ is C.
In some embodiments, the compound is further defined as:

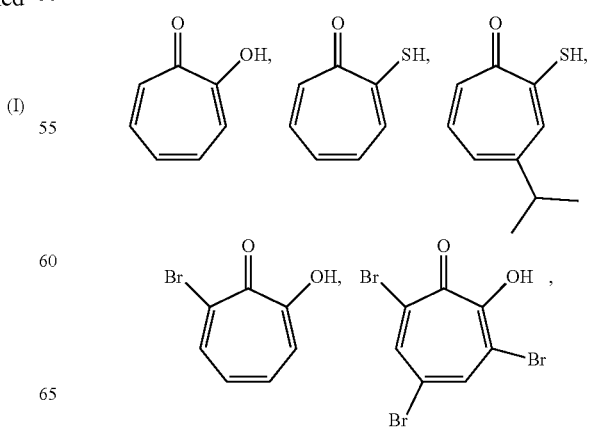

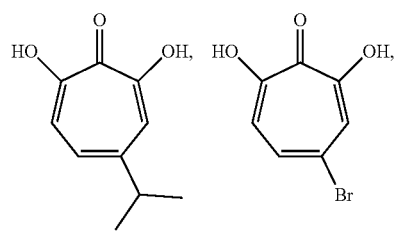
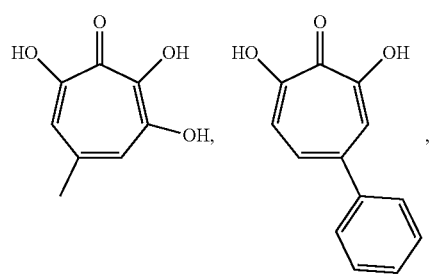
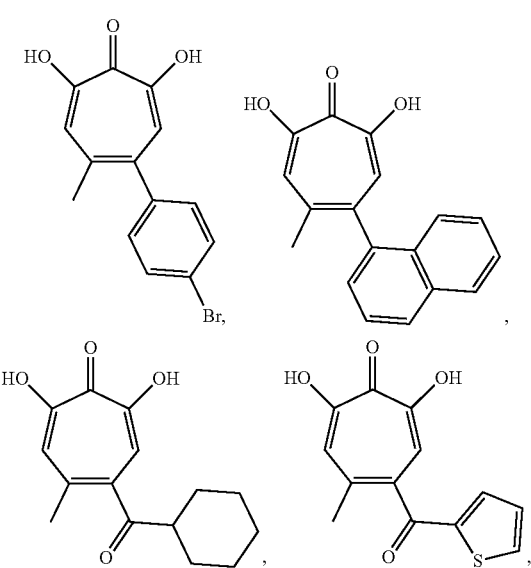
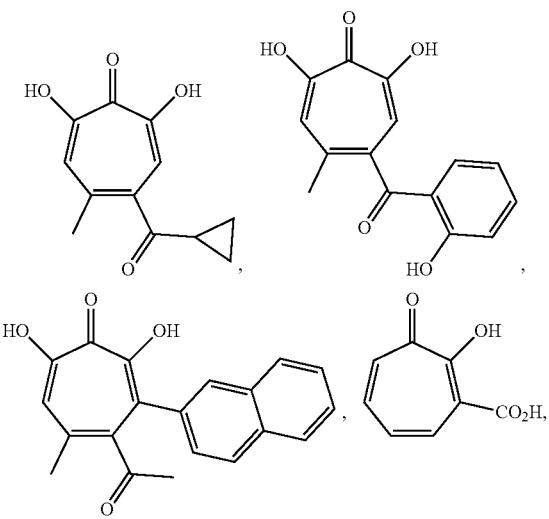
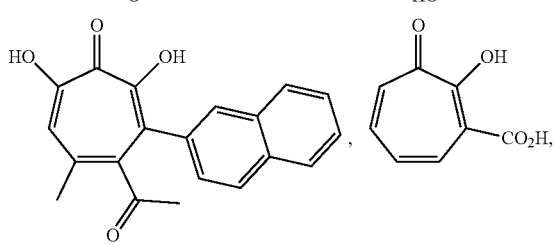
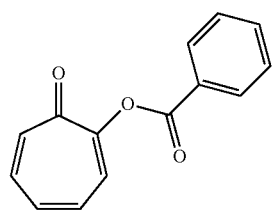
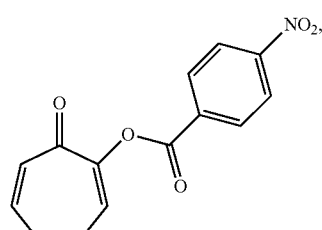
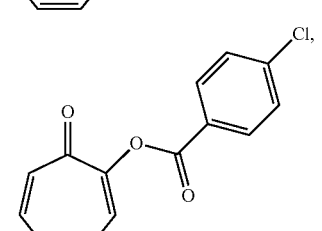
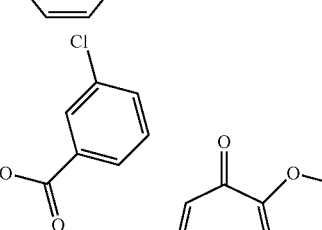
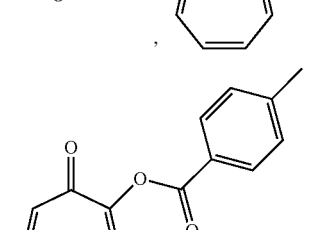
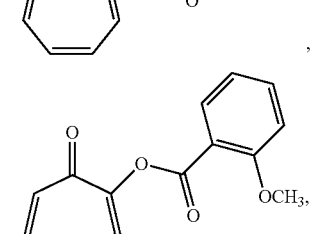
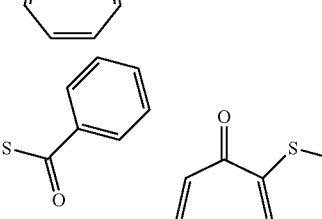

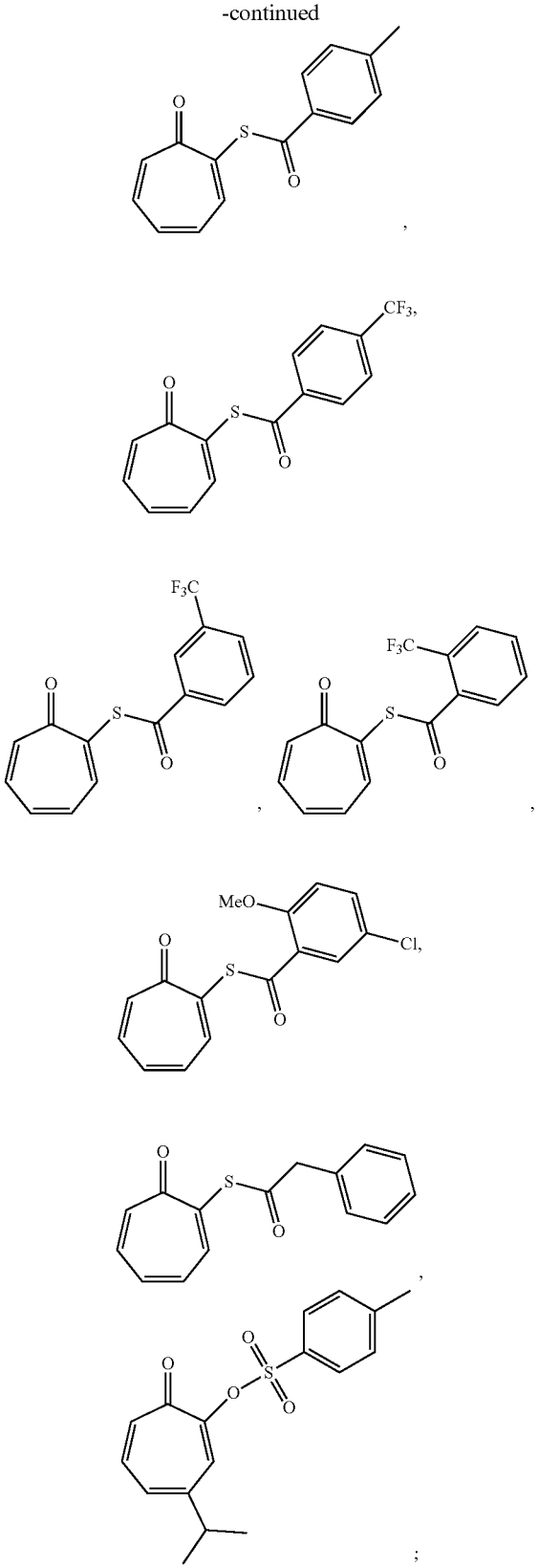
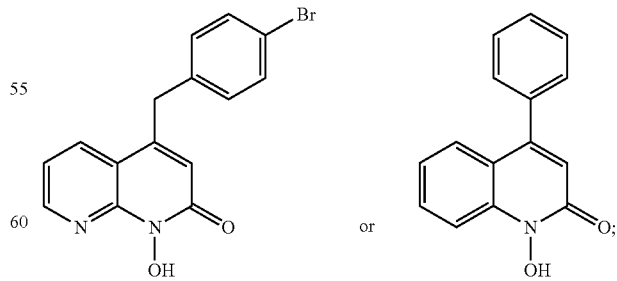
or a pharmaceutically acceptable salt or tautomer thereof.
In other embodiments, the compound is further defined as:
or a pharmaceutically acceptable salt or tautomer thereof.
In other embodiments, the compound is further defined as:
or a pharmaceutically acceptable salt or tautomer thereof.
In other embodiments, the compound is further defined as:

[Structure: 1-hydroxyquinolin-2(1H)-one]

or a pharmaceutically acceptable salt or tautomer thereof.

In another aspect, the present disclosure provides methods of killing a bacterium comprising contacting the bacterium with an effective amount of a compound of the formula:

[Structure (I): substituted cycloheptatrienone with R$_1$, R$_1'$, R$_2$, R$_2'$, R$_3$, R$_3'$]

(I)

wherein:
$R_1$ is hydrogen, halo, or a group of the formula:
—X—Y$_1$, wherein:
X is O or S;
Y$_1$ is hydrogen, acyl$_{(C\leq12)}$, substituted aryl$_{(C\leq12)}$, arylsulfonyl$_{(C\leq12)}$, or substituted arylsulfonyl$_{(C\leq12)}$;
$R_1'$ is hydrogen, hydroxy, or halo;
$R_2$ and $R_2'$ are each independently hydrogen, halo, alkyl$_{(C\leq6)}$, substituted alkyl$_{(C\leq6)}$, aryl$_{(C\leq12)}$, substituted aryl$_{(C\leq12)}$, —C(O)R$_a$, wherein
$R_a$ is alkyl$_{(C\leq12)}$, cycloalkyl$_{(C\leq12)}$, aryl$_{(C\leq18)}$, heteroaryl$_{(C\leq12)}$, or a substituted version of any of these groups;
$R_3$ and $R_3'$ are each independently hydrogen, halo, hydroxy, carboxy, aryl$_{(C\leq12)}$, or substituted aryl$_{(C\leq12)}$;
provided that if $R_1$ is —OH then $R_1'$ is not hydrogen or if $R_1'$ is —OH and then $R_1$ is not hydrogen; or
a compound of the formula:

[Structure (II): quinolinone derivative with R$_4$, R$_5$, R$_6$, R$_7$, Z$_1$, Z$_2$]

(II)

wherein:
$Z_1$ and $Z_2$ are each independently C or N;
$R_4$ is acyl$_{(C\leq6)}$, substituted acyl$_{(C\leq6)}$, or carboxyl;
$R_5$ is alkyl$_{(C\leq6)}$ or substituted alkyl$_{(C\leq6)}$, cycloalkyl$_{(C4-C8)}$ or substituted cycloalkyl$_{(C4-C8)}$;
$R_6$ is aryl$_{(C\leq12)}$, aralkyl$_{(C\leq12)}$, heterocycloalkyl$_{(C\leq6)}$, or a substituted version of any of these groups;
$R_7$ is absent, hydrogen, halo, acyl$_{(C\leq8)}$, or substituted acyl$_{(C\leq8)}$;
provided that $R_7$ is only absent if $Z_2$ is N; or
a compound of the formula:

[Structure (III): 1-hydroxyquinolin-2(1H)-one derivative with R$_8$, Z$_3$]

(III)

wherein:
$Z_3$ is either C or N;
$R_8$ is hydrogen, alkyl$_{(C\leq6)}$, substituted alkyl$_{(C\leq6)}$, aryl$_{(C\leq12)}$, substituted aryl$_{(C\leq12)}$, aralkyl$_{(C\leq12)}$, or substituted aralkyl$_{(C\leq12)}$; or
a compound of the formula:

[Structure (IV): furan-phenyl methylidene dihydropyridine dione with CN]

(IV)

[Structure (V): bis-tropone sulfide]

(V)

[Structure (VI): bis-tropone disulfide]

(VI)

or a pharmaceutically acceptable salt thereof.

In yet another aspect, the present disclosure provides methods of inhibiting the growth of a bacterium comprising contacting the bacterium with an effective amount of a compound of the formula:

[Structure (I): substituted cycloheptatrienone with R$_1$, R$_1'$, R$_2$, R$_2'$, R$_3$, R$_3'$]

(I)

wherein:
$R_1$ is hydrogen, halo, or a group of the formula:
—X—Y$_1$, wherein:
X is O or S;

$Y_1$ is hydrogen, acyl$_{(C \leq 12)}$, substituted aryl$_{(C \leq 12)}$, arylsulfonyl$_{(C \leq 12)}$, or substituted arylsulfonyl$_{(C \leq 12)}$;

$R_1'$ is hydrogen, hydroxy, or halo;

$R_2$ and $R_2'$ are each independently hydrogen, halo, alkyl$_{(C \leq 6)}$, substituted alkyl$_{(C \leq 6)}$, aryl$_{(C \leq 12)}$, substituted aryl$_{(C \leq 12)}$, —C(O)R$_a$, wherein
R$_a$ is alkyl$_{(C \leq 12)}$, cycloalkyl$_{(C \leq 12)}$, aryl$_{(C \leq 18)}$, heteroaryl$_{(C \leq 12)}$, or a substituted version of any of these groups;

$R_3$ and $R_3'$ are each independently hydrogen, halo, hydroxy, carboxy, aryl$_{(C \leq 12)}$, or substituted aryl$_{(C \leq 12)}$;

provided that if $R_1$ is —OH then $R_1'$ is not hydrogen or if $R_1'$ is —OH and then $R_1$ is not hydrogen; or a compound of the formula:

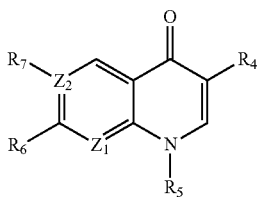

(II)

wherein:

$Z_1$ and $Z_2$ are each independently C or N;

$R_4$ is acyl$_{(C \leq 6)}$, substituted acyl$_{(C \leq 6)}$, or carboxyl;

$R_5$ is alkyl$_{(C \leq 6)}$ or substituted alkyl$_{(C \leq 6)}$, cycloalkyl$_{(C4-C8)}$, or substituted cycloalkyl$_{(C4-C8)}$;

$R_6$ is aryl$_{(C \leq 12)}$, aralkyl$_{(C \leq 12)}$, heterocycloalkyl$_{(C \leq 6)}$, or a substituted version of any of these groups;

$R_7$ is absent, hydrogen, halo, acyl$_{(C \leq 8)}$, or substituted acyl$_{(C \leq 8)}$;

provided that $R_7$ is only absent if $Z_2$ is N; or a compound of the formula:

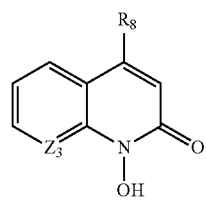

(III)

wherein:

$Z_3$ is either C or N;

$R_8$ is hydrogen, alkyl$_{(C \leq 6)}$, substituted alkyl$_{(C \leq 6)}$, aryl$_{(C \leq 12)}$, substituted aryl$_{(C \leq 12)}$, aralkyl$_{(C \leq 12)}$, or substituted aralkyl$_{(C \leq 12)}$; or a compound of the formula:

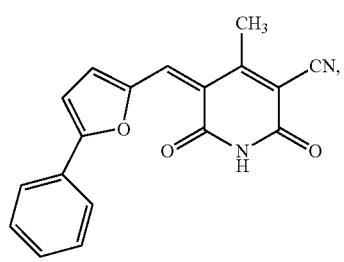

(IV)

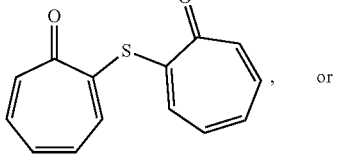

(V)

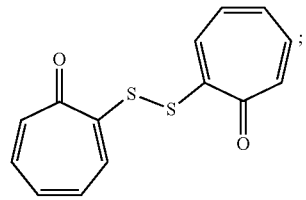

(VI)

or a pharmaceutically acceptable salt thereof.

In some embodiments, the bacterium is either a gram positive or a gram negative bacterium. In some embodiments, the bacterium is a gram positive bacterium. In other embodiments, the bacterium is a gram negative bacterium. In some embodiments, the bacterium is sensitive to one or more antibiotics. In some embodiments, the bacterium is sensitive to more than one antibiotic. In some embodiments, the antibiotic is methicillin, cefoxitin, oxacillin, gentamicin, ciprofloxacin, levofloxacin, moxifloxacin, erythromycin, clindamycin, linezolid, daptomycin, vancomycin, doxycycline, tobramycin, tetracycline, tigecycline, nitrofurantoin, rifampin, trimethoprim-sulfamethoxazole, amoxicillin-clavulanic acid, ampicillin-sulbactam, piperacillin-tazobactam, cefepime, ertapenem, imipenem, and meropenem. In some embodiments, the bacterium is a gram positive bacterium and is resistant to cefoxitin, oxacillin, gentamicin, ciprofloxacin, levofloxacin, moxifloxacin, erythromycin, clindamycin, linezolid, daptomycin, vancomycin, doxycycline, tetracycline, tigecycline, nitrofurantoin, rifampin, or trimethoprim-sulfamethoxazole. In other embodiments, the bacterium is a gram negative bacterium and is resistant to amoxicillin-clavulanic acid, ampicillin-sulbactam, piperacillin-tazobactam, cefepime, ertapenem, imipenem, meropenem, gentamicin, tobramycin, ciprofloxacin, levofloxacin, nitrofurantoin, or trimethoprim-sulfamethoxazole. In some embodiments, the bacterium is from a hospital acquired infection such as an infection wherein the bacterium is *Staphylococcus saprophyticus* (*S. saprophyticus*), *Staphylococcus aureus* (*S. aureus*), methicillin-resistant *Staphylococcus aureus* (MRSA), coagulase negative *staphylococcus* (CNS), methicillin-resistant CNS (MRCNS), *E. coli*, multi-drug resistance (MDR) *E. coli*, MDR-*Citrobacter koseri*, MDR-*Enterobacter cloacae* complex, MDR-*Morganella morganii*, MDR-*Klebsiella pneumonia* or MDR-*Acinetobacter baumannii*.

In some embodiments, the methods further comprise administering a second antibiotic agent. In some embodiments, the methods comprise administering the agent once. In other embodiments, the methods comprise administering the agent two or more times. In some embodiments, the patient is a mammal such as a human.

It is contemplated that any method or composition described herein can be implemented with respect to any other method or composition described herein. For example, an aldehyde synthesized by one method may be used in the preparation of a final compound according to a different method.

The use of the word "a" or "an" when used in conjunction with the term "comprising" in the claims and/or the specification may mean "one," but it is also consistent with the meaning of "one or more," "at least one," and "one or more than one." The word "about" means plus or minus 5% of the stated number.

Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

(FIG. 1B) *E. coli*. (FIG. 1C) *Pseudomonas aeruginosa* (*Ps. aeruginosa*) and (FIG. 1D) *Acinetobacter baumannii* (*A. baumannii*). Inhibition was measured at 5.8, 20.4 and 71.4 μM for 18-24 hours at 37° C. (67: Ciprofloxacin, positive control)

DESCRIPTION OF ILLUSTRATIVE EMBODIMENTS

Figures 1A, 1B, 1C, 1D:
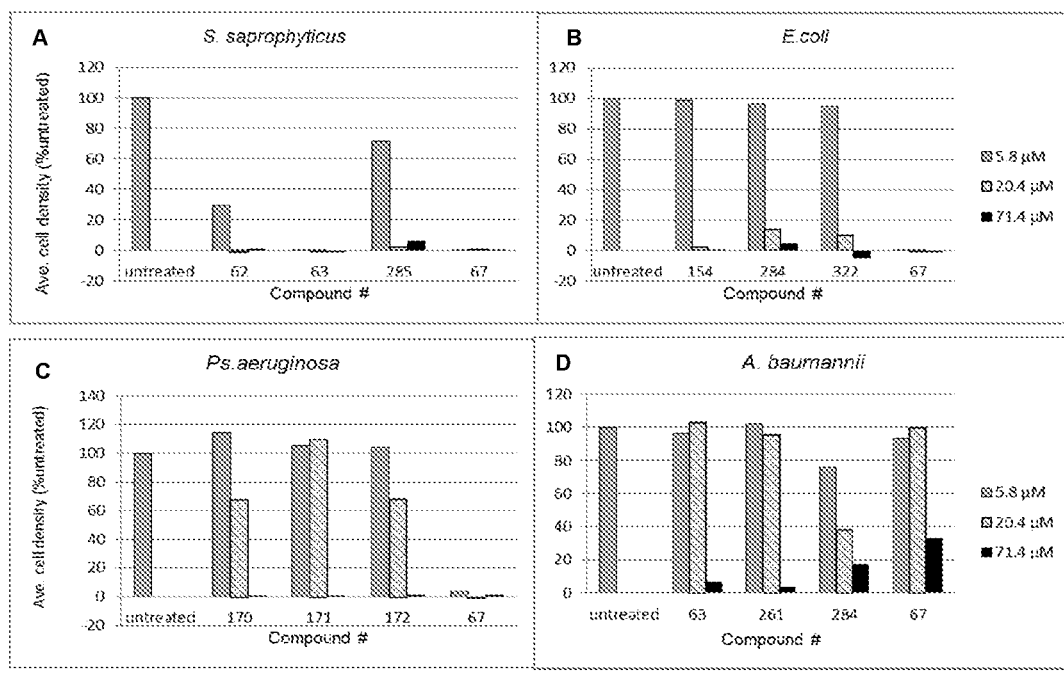
FIGS. 1A-1D are selected data from inhibitory screening of NTS compounds against (FIG. 1A) *Staph. saprophyticus*.

In some aspects, the present disclosure provides methods of using the compounds described herein for the treatment of a bacterial infection. In some embodiments, these compounds possess a unique mechanism of action for the inhibition of bacterial growth. It is contemplated that the compounds described herein may be used to treat one or more clinically relevant bacterial infections including a hospital acquired infection such as *Enterococcus faecium, Staphylococcus aureus, Klebsiella pneumoniae, Acinetobacter baumannii, Pseudomonas aeruginosa,* and *Enterobacter* species. These and other embodiments are described in more detail below.

I. COMPOUNDS AND FORMULATIONS THEREOF

A. Compounds

In one aspect, the present disclosure provides compounds of the formula:

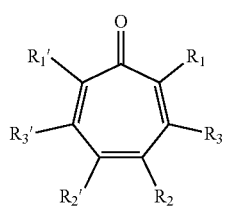

(I)

wherein:

$R_1$ is hydrogen, halo, or a group of the formula:
—X—$Y_1$, wherein:
X is O or S;
$Y_1$ is hydrogen, acyl$_{(C \leq 12)}$, substituted aryl$_{(C \leq 12)}$, arylsulfonyl$_{(C \leq 12)}$, or substituted arylsulfonyl$_{(C \leq 12)}$;

$R_1'$ is hydrogen, hydroxy, or halo;

$R_2$ and $R_2'$ are each independently hydrogen, halo, alkyl$_{(C \leq 6)}$, substituted alkyl$_{(C \leq 6)}$, aryl$_{(C \leq 12)}$, substituted aryl$_{(C \leq 12)}$, —C(O)$R_a$, wherein $R_a$ is alkyl$_{(C \leq 12)}$, cycloalkyl$_{(C \leq 12)}$, aryl$_{(C \leq 18)}$, heteroaryl$_{(C \leq 12)}$, or a substituted version of any of these groups;

$R_3$ and $R_3'$ are each independently hydrogen, halo, hydroxy, carboxy, aryl$_{(C \leq 12)}$, or substituted aryl$_{(C \leq 12)}$;

provided that if $R_1$ is —OH then $R_1'$ is not hydrogen or if $R_1'$ is —OH and then $R_1$ is not hydrogen; or a compound of the formula:

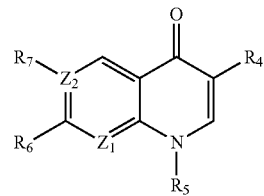

(II)

wherein:

$Z_1$ and $Z_2$ are each independently C or N;

$R_4$ is acyl$_{(C \leq 6)}$, substituted acyl$_{(C \leq 6)}$, or carboxyl;

$R_5$ is alkyl$_{(C \leq 6)}$ or substituted alkyl$_{(C \leq 6)}$, cycloalkyl$_{(C4-C8)}$, or substituted cycloalkyl$_{(C4-C8)}$;

$R_6$ is aryl$_{(C \leq 12)}$, aralkyl$_{(C \leq 12)}$, heterocycloalkyl$_{(C \leq 6)}$, or a substituted version of any of these groups;

$R_7$ is absent, hydrogen, halo, acyl$_{(C \leq 8)}$, or substituted acyl$_{(C \leq 8)}$;

provided that $R_7$ is only absent if $Z_2$ is N; or a compound of the formula:

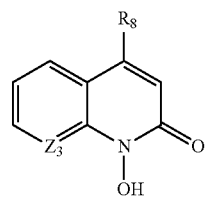

(III)

wherein:

$Z_3$ is either C or N;

$R_8$ is hydrogen, alkyl$_{(C \leq 6)}$, substituted alkyl$_{(C \leq 6)}$, aryl$_{(C \leq 12)}$, substituted aryl$_{(C \leq 12)}$, aralkyl$_{(C \leq 12)}$, or substituted aralkyl$_{(C \leq 12)}$; or a compound of the formula:

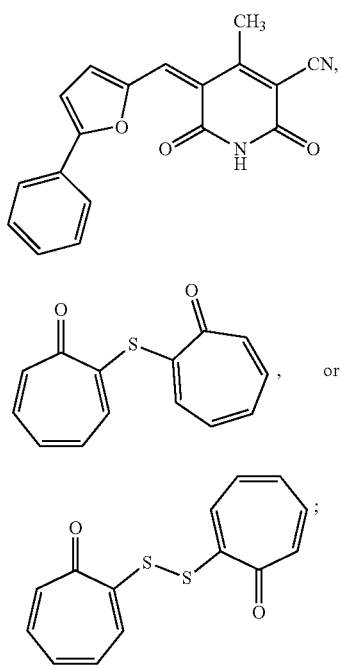

(IV)

(V)

(VI)

or a pharmaceutically acceptable salt thereof.

Additionally, the compounds provided by the present disclosure are shown, for example, above in the summary section and in the examples and claims below. Methods of making the compounds are known in the art including in Egawa et al., 1987, Grohe et al., 1987, Sanchez et al., 1988, JP56025234, Matsumoto et al., 1975, WO 2005/113509, WO 2005/113508, Wuerthner et al., 2001. McCord et al., 1984, Hamana et al., 1962, WO 2008/010964, Masaoka et al., 2016, and Williams et al., 2010, the entirety of which is incorporated herein by reference. These methods can be further modified and optimized using the principles and techniques of organic chemistry as applied by a person skilled in the art. Such principles and techniques are taught, for example, in *March's Advanced Organic Chemistry: Reactions, Mechanisms, and Structure* (2007), which is incorporated by reference herein.

The antibiotics of the disclosure may contain one or more asymmetrically-substituted carbon or nitrogen atoms, and may be isolated in optically active or racemic form. Thus, all chiral, diastereomeric, racemic form, epimeric form, and all geometric isomeric forms of a chemical formula are intended, unless the specific stereochemistry or isomeric form is specifically indicated. Compounds may occur as racemates and racemic mixtures, single enantiomers, diastereomeric mixtures and individual diastereomers. In some embodiments, a single diastereomer is obtained. The chiral centers of the compounds of the present disclosure can have the (S) or the (R) configuration.

Chemical formulas used to represent the antibiotics of the present disclosure will typically only show one of possibly several different tautomers. For example, many types of ketone groups are known to exist in equilibrium with corresponding enol groups. Similarly, many types of imine groups exist in equilibrium with enamine groups. Regardless of which tautomer is depicted for a given compound, and regardless of which one is most prevalent, all tautomers of a given chemical formula are intended.

The antibiotics of the present disclosure may also have the advantage that they may be more efficacious than, be less toxic than, be longer acting than, be more potent than, produce fewer side effects than, be more easily absorbed than, and/or have a better pharmacokinetic profile (e.g., higher oral bioavailability and/or lower clearance) than, and/or have other useful pharmacological, physical, or chemical properties over, compounds known in the prior art, whether for use in the indications stated herein or otherwise.

In addition, atoms making up the antibiotics of the present disclosure are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$.

The antibiotics of the present disclosure may also exist in prodrug form. Since prodrugs are known to enhance numerous desirable qualities of pharmaceuticals (e.g., solubility, bioavailability, manufacturing, etc.), the compounds employed in some methods of the disclosure may, if desired, be delivered in prodrug form. Thus, the disclosure contemplates prodrugs of compounds of the present disclosure as well as methods of delivering prodrugs. Prodrugs of the compounds employed in the disclosure may be prepared by modifying functional groups present in the compound in such a way that the modifications are cleaved, either in routine manipulation or in vivo, to the parent compound. Accordingly, prodrugs include, for example, compounds described herein in which a hydroxy, amino, or carboxy group is bonded to any group that, when the prodrug is administered to a subject, cleaves to form a hydroxy, amino, or carboxylic acid, respectively.

It should be recognized that the particular anion or cation forming a part of any salt form of a compound provided herein is not critical, so long as the salt, as a whole, is pharmacologically acceptable. Additional examples of pharmaceutically acceptable salts and their methods of preparation and use are presented in *Handbook of Pharmaceutical Salts: Properties, and Use* (2002), which is incorporated herein by reference.

Those skilled in the art of organic chemistry will appreciate that many organic compounds can form complexes with solvents in which they are reacted or from which they are precipitated or crystallized. These complexes are known as "solvates." For example, a complex with water is known as a "hydrate." Solvates of the antibiotics provided herein are within the scope of the disclosure. It will also be appreciated by those skilled in organic chemistry that many organic compounds can exist in more than one crystalline form. For example, crystalline form may vary from solvate to solvate. Thus, all crystalline forms of the antibiotics or the pharmaceutically acceptable solvates thereof are within the scope of the present disclosure.

B. Formulations

In some embodiments of the present disclosure, the compounds are included a pharmaceutical formulation. Materials for use in the preparation of microspheres and/or microcapsules are, e.g., biodegradable/bioerodible polymers such as polygalactin, poly-(isobutyl cyanoacrylate), poly(2-hydroxyethyl-L-glutamine) and, poly(lactic acid). Biocompatible carriers that may be used when formulating a controlled release parenteral formulation are carbohydrates (e.g., dextrans), proteins (e.g., albumin), lipoproteins, or antibodies. Materials for use in implants can be non-biodegradable (e.g., polydimethyl siloxane) or biodegradable (e.g., poly(caprolactone), poly(lactic acid), poly(glycolic acid) or poly(ortho esters) or combinations thereof).

Formulations for oral use include tablets containing the active ingredient(s) (e.g., the antibiotics) in a mixture with non-toxic pharmaceutically acceptable excipients. Such formulations are known to the skilled artisan. Excipients may be, for example, inert diluents or fillers (e.g., sucrose, sorbitol, sugar, mannitol, microcrystalline cellulose, starches including potato starch, calcium carbonate, sodium chloride, lactose, calcium phosphate, calcium sulfate, or sodium phosphate); granulating and disintegrating agents (e.g., cellulose derivatives including microcrystalline cellulose, starches including potato starch, croscarmellose sodium, alginates, or alginic acid); binding agents (e.g., sucrose, glucose, sorbitol, acacia, alginic acid, sodium alginate, gelatin, starch, pregelatinized starch, microcrystalline cellulose, magnesium aluminum silicate, carboxymethylcellulose sodium, methylcellulose, hydroxypropyl methylcellulose, ethylcellulose, polyvinylpyrrolidone, or polyethylene glycol); and lubricating agents, glidants, and antiadhesives (e.g., magnesium stearate, zinc stearate, stearic acid, silicas, hydrogenated vegetable oils, or talc). Other pharmaceutically acceptable excipients can be colorants, flavoring agents, plasticizers, humectants, buffering agents, and the like.

The tablets may be uncoated or they may be coated by known techniques, optionally to delay disintegration and absorption in the gastrointestinal tract and thereby providing a sustained action over a longer period. The coating may be adapted to release the active drug in a predetermined pattern (e.g., in order to achieve a controlled release formulation) or it may be adapted not to release the active drug until after passage of the stomach (enteric coating). The coating may be a sugar coating, a film coating (e.g., based on hydroxypropyl methylcellulose, methylcellulose, methyl hydroxyethylcellulose, hydroxypropylcellulose, carboxymethylcellulose, acrylate copolymers, polyethylene glycols and/or polyvinylpyrrolidone), or an enteric coating (e.g., based on methacrylic acid copolymer, cellulose acetate phthalate, hydroxypropyl methylcellulose phthalate, hydroxypropyl methylcellulose acetate succinate, polyvinyl acetate phthalate, shellac, and/or ethylcellulose). Furthermore, a time delay material, such as, e.g., glyceryl monostearate or glyceryl distearate may be employed.

C. Disinfectant Compositions

The antibiotics of the present disclosure are useful in a variety of environments including industrial, clinical, the household, and personal care. The antibiotics of the present disclosure for industrial, pharmaceutical, household and personal care use may comprise at least one active ingredient, of which the antibiotics is an active ingredient acting alone, additively, or synergistically against the target microbe.

Accordingly, the antibiotics of the present disclosure may be used to form contact-killing coatings or layers on a variety of substrates including personal care products (e.g., toothbrushes, contact lens cases and dental equipment), healthcare products, household products, food preparation surfaces and packaging, and laboratory and scientific equipment. Further, other substrates include medical devices such as catheters, urological devices, blood collection and transfer devices, tracheotomy devices, intraocular lenses, wound dressings, sutures, surgical staples, membranes, shunts, gloves, tissue patches, prosthetic devices (e.g., heart valves) and wound drainage tubes. Still further, other substrates include textile products such as carpets and fabrics, paints and joint cement. A further use is as an antimicrobial soil fumigant.

II. BACTERIAL INFECTIONS

In some aspects of the present disclosure, the compounds disclosed herein may be used to treat a bacterial infection. While humans contain numerous different bacteria on and inside their bodies, an imbalance in bacterial levels or the introduction of pathogenic bacteria can cause a symptomatic bacterial infection. Pathogenic bacteria cause a variety of different diseases including but not limited to numerous foodborne illness, typhoid fever, tuberculosis, pneumonia, syphilis, and leprosy.

Additionally, different bacteria have a wide range of interactions with body and those interactions can modulate ability of the bacteria to cause an infection. For example, bacteria can be conditionally pathogenic such that they only cause an infection under specific conditions. For example, *Staphylococcus* and *Streptococcus* bacteria exist in the normal human bacterial biome, but these bacteria when they are allowed to colonize other parts of the body causing a skin infection, pneumonia, or sepsis. Other bacteria are known as opportunistic pathogens and only cause diseases in a patient with a weakened immune system or another disease or disorder.

Bacteria can also be intracellular pathogens which can grow and reproduce within the cells of the host organism. Such bacteria can be divided into two major categories as either obligate intracellular parasites or facultative intracellular parasites. Obligate intracellular parasites require the host cell in order to reproduce and include such bacteria as but are not limited to *Chlamydophila*, *Rickettsia*, and *Ehrlichia* which are known to cause pneumonia, urinary tract infections, typhus, and Rocky Mountain spotted fever. Facultative intracellular parasites can reproduce either intracellular or extracellular. Some non-limiting examples of facultative intracellular parasites include *Salmonella*, *Listeria*, *Legionella*, *Mycobacterium*, and *Brucella* which are known to cause food poisoning, typhoid fever, sepsis, meningitis, Legionnaire's disease, tuberculosis, leprosy, and brucellosis.

The compounds described herein may be used in the treatment of bacterial infections, including those caused by *Staphyloccoccus aureus*. *S. aureus* is a major human pathogen, causing a wide variety of illnesses ranging from mild skin and soft tissue infections and food poisoning to life-threatening illnesses such as deep post-surgical infections, septicaemia, endocarditis, necrotizing pneumonia, and toxic shock syndrome. These organisms have a remarkable ability to accumulate additional antibiotic resistance determinants, resulting in the formation of multiply-drug-resistant strains.

Methicillin, being the first semi-synthetic penicillin to be developed, was introduced in 1959 to overcome the problem of penicillin-resistant *S. aureus* due to β-lactamase (penicillinase) production (Livermore, 2000). However, methicillin-resistant *S. aureus* (MRSA) strains were identified soon after the introduction of methicillin (Barber, 1961; Jevons, 1961). The compounds described herein may be used in the treatment of MRSA bacterial strains.

Additionally, the compounds of the present disclosure may be used to treat a *Steptococcus pneumoniae* infection. *Streptococcus pneumoniae* is a gram-positive, alpha-hemolytic, bile soluble aerotolerant anaerobe and a member of the genus *Streptococcus*. A significant human pathogenic bacterium, *S. pneumoniae* was recognized as a major cause of pneumonia in the late 19th century and is the subject of many humoral immunity studies.

Despite the name, the organism causes many types of pneumococcal infection other than pneumonia, including acute sinusitis, otitis media, meningitis, bacteremia, sepsis, osteomyelitis, septic arthritis, endocarditis, peritonitis, pericarditis, cellulitis, and brain abscess. *S. pneumoniae* is the most common cause of bacterial meningitis in adults and children, and is one of the top two isolates found in ear infection, otitis media. Pneumococcal pneumonia is more common in the very young and the very old.

*S. pneumoniae* can be differentiated from *S. viridans*, some of which are also alpha hemolytic, using an optochin test, as *S. pneumoniae* is optochin sensitive. *S. pneumoniae* can also be distinguished based on its sensitivity to lysis by bile. The encapsulated, gram-positive coccoid bacteria have a distinctive morphology on gram stain, the so-called, "lancet shape." It has a polysaccharide capsule that acts as a virulence factor for the organism; more than 90 different serotypes are known, and these types differ in virulence, prevalence, and extent of drug resistance.

*S. pneumoniae* is part of the normal upper respiratory tract flora but as with many natural flora, it can become pathogenic under the right conditions (e.g., if the immune system of the host is suppressed). Invasins such as Pneumolysin, an anti-phagocytic capsule, various adhesins and immunogenic cell wall components are all major virulence factors.

Finally, bacterial infections could be targeted to a specific location in or on the body. For example, bacteria could be harmless if only exposed to the specific organs, but when it comes in contact with a specific organ or tissue, the bacteria can begin replicating and cause a bacterial infection.

A. Gram-Positive Bacteria

In some aspects of the present disclosure, the compounds disclosed herein may be used to treat a bacterial infection by a gram-positive bacteria. Gram-positive bacteria contain a thick peptidoglycan layer within the cell wall which prevents the bacteria from releasing the stain when dyed with crystal violet. Without being bound by theory, the gram-positive bacteria are often more susceptible to antibiotics. Generally, gram-positive bacteria, in addition to the thick peptidoglycan layer, also comprise a lipid monolayer and contain teichoic acids which react with lipids to form lipoteichoic acids that can act as a chelating agent. Additionally, in gram-positive bacteria, the peptidoglycan layer is outer surface of the bacteria. Many gram-positive bacteria have been known to cause disease including, but are not limited to, *Streptococcus, Straphylococcus, Corynebacterium, Enterococcus, Listeria, Bacillus, Clostridium, Rathybacter, Leifsonia*, and *Clavibacter*.

B. Gram-Negative Bacteria

In some aspects of the present disclosure, the compounds disclosed herein may be used to treat a bacterial infection by a gram-negative bacteria. Gram-negative bacteria do not retain the crystal violet stain after washing with alcohol. Gram-negative bacteria, on the other hand, have a thin peptidoglycan layer with an outer membrane of lipopolysaccharides and phospholipids as well as a space between the peptidoglycan and the outer cell membrane called the periplasmic space. Gram-negative bacterial generally do not have teichoic acids or lipoteichoic acids in their outer coating. Generally, gram-negative bacteria also release some endotoxin and contain prions which act as molecular transport units for specific compounds.

Most bacteria are gram-negative. Some non-limiting examples of gram-negative bacteria include *Bordetella, Borrelia, Burcelia, Campylobacteria, Escherichia, Francisella, Haemophilus, Helicobacter, Legionella, Leptospira, Neisseria, Pseudomonas, Rickettsia, Salmonella, Shigella, Treponema, Vibrio*, and *Yersinia*.

C. Gram-Indeterminate Bacteria

In some aspects of the present disclosure, the compounds disclosed herein may be used to treat a bacterial infection by a gram-indeterminate bacteria. Gram-indeterminate bacteria do not full stain or partially stain when exposed to crystal violet. Without being bound by theory, a gram-indeterminate bacteria may exhibit some of the properties of the gram-positive and gram-negative bacteria. A non-limiting example of a gram-indeterminate bacteria include *Mycobacterium tuberculosis* or *Mycobacterium leprae*.

D. Other Means of Classification

Gram-positive and Gram-negative cocci include, but are not limited to, *Aerococcus, Enterococcus, Halococcus, Leuconostoc, Micrococcus, Mobiluncus, Moraxella catarrhalis, Neisseria* (including *N. gonorrheae* and *N. meningitidis*), *Pediococcus, Peptostreptococcus, Staphylococcus* species (including *S. aureus*, methicillin-resistant *S. aureus*, coagulase-negative *S. aureus*, and *S. saprophyticus*), *Streptococcus* species (including *S. pyogenes, S. agalactiae, S. bovis, S. pneumoniae, S. mutans, S. sanguis, S. equi, S. equinus, S. thermophilus, S. morbillorum, S. hansenii, S. pleomorphus*, and *S. parvulus*), and *Veillonella*.

The Gram-positive and Gram-negative straight, curved, helical/vibrioid and branched rods include, but are not limited to, *Acetobacter, Acinetobacter* (including *A. baumannii*), *Actinobacillus equuli, Aeromonas, Agrobacterium, Alcaligenes, Aquaspirillum, Arcanobacterium haemolyticum, Bacillus* species (including *B. cereus* and *B. anthracis*), *Bacteroides* species (including *B. fragilis*), *Bartonella, Bordetella* species (including *B. pertussis*), *Brochothrix, Brucella, Burkholderia cepacia, Calymmatobacterium granulomatis, Campylobacter* species (including *C. jejuni*), *Capnocytophaga, Caulobacter, Chromobacterium violaceum, Citrobacter, Clostridium* species (including *C. perfringens, C. tetani* and *C. difficile*), *Comamonas, Curtobacterium, Edwardsiella, Eikenella, Enterobacter, Erwinia, Erysipelothrix, Escherichia* species (including *E. coli*), *Flavobacterium* species (including *E. meninosepticum*), *Francisella* species (including *E. tularensis*), *Fusobacterium* (including *E. nucleatum*), *Gardnerella* species (including *G. vaginalis*), *Gluconobacter, Haemophilus* species (including *H. influenzae* and *H. ducreyi*), *Hafnia, Helicobacter* (including *H. pylori*), *Herpetosiphon, Klebsiella* species (including *K. pneumoniae*), *Kluyvera, Lactobacillus, Legionella* species (including *E. pneumophila*), *Leptotrichia, Listeria* species (including *E. monocytogenes*), *Microbacterium, Morganella, Nitrobacter, Nitrosomonas, Pasteurella* species (including *P. multocida*), *Pectinatus, Porphyromonas gingivalis, Proteus* species (including *E. mirabilis*), *Providencia, Pseudomonas* species (including *P. aeruginosa, P. mallei, P. pseudomallei* and *E. solanacearum*), *Rahnella, Renibacterium salmoninarum, Salmonella, Serratia, Shigella, Spirillum, Streptobacillus* species (including *S. moniliformis*), *Vibrio* species (including *V. cholerae* and *V. vulnificus*), *Wolinella, Xanthobacter, Xenorhabdus, Yersinia* species (including *Y. pestis* and *Y. enter ocolitica*), *Zanthomonas* and *Zymomonas*.

E. Diseases or Infections Caused by Bacteria

The clinical diseases or infections caused by Gram-positive and/or Gram-negative bacteria, treatable with the present disclosure include abscesses, bacteremia, contamination of peritoneal dialysis fluid, endocarditis, pneumonia, meningitis, osteomyelitis, cellulitis, pharyngitis, otitis media, sinusitis, scarlet fever, arthritis, urinary tract infection, laryngotracheitis, erysipeloid, gas gangrene, tetanus, typhoid fever, acute gastroenteritis, bronchitis, epiglottitis, plague, sepsis, chancroid, wound and burn infection, cholera, glanders, periodontitis, genital infections, empyema, granuloma inguinale, Legionnaire's disease, paratyphoid, bacillary dysentary, brucellosis, diphtheria, pertussis, botulism, toxic shock syndrome, mastitis, rheumatic fever, cystic fibrosis, eye infections, plaque, and dental caries. Other uses include swine erysipelas, peritonitis, abortion, encephalitis, anthrax, nocardiosis, pericarditis, mycetoma, peptic ulcer, melioidosis, HaverhiU fever, tularemia, Moko disease, galls (e.g., crown, cane and leaf), hairy root, bacterial rot, bacterial blight, bacterial brown spot, bacterial wilt, bacterial fin rot, dropsy, columnaris disease, pasteurellosis, furunculosis, enteric redmouth disease, vibriosis offish, and fouling of medical devices.

III. THERAPIES

A. Pharmaceutical Formulations and Routes of Administration

Where clinical applications are contemplated, it will be necessary to prepare pharmaceutical compositions in a form appropriate for the intended application. In some embodiments, such formulation with the compounds of the present disclosure is contemplated. Generally, this will entail preparing compositions that are essentially free of pyrogens, as well as other impurities that could be harmful to humans or animals.

One will generally desire to employ appropriate salts and buffers to render delivery vectors stable and allow for uptake by target cells. Buffers also will be employed when recombinant cells are introduced into a patient. Aqueous compositions of the present disclosure comprise an effective amount of the vector to cells, dissolved or dispersed in a pharmaceutically acceptable carrier or aqueous medium. Such compositions also are referred to as inocula. The phrase "pharmaceutically or pharmacologically acceptable" refers to molecular entities and compositions that do not produce adverse, allergic, or other untoward reactions when administered to an animal or a human. As used herein, "pharmaceutically acceptable carrier" includes any and all solvents, dispersion media, coatings, an additional antibacterial and antifungal agents, isotonic and absorption delaying agents and the like. The use of such media and agents for pharmaceutically active substances is well known in the art. Except insofar as any conventional media or agent is incompatible with the vectors or cells of the present disclosure, its use in therapeutic compositions is contemplated. Supplementary active ingredients also can be incorporated into the compositions.

The active compositions of the present disclosure may include classic pharmaceutical preparations. Administration of these compositions according to the present disclosure will be via any common route so long as the target tissue is available via that route. Such routes include oral, nasal, buccal, rectal, vaginal or topical route. Alternatively, administration may be by orthotopic, intradermal, subcutaneous, intramuscular, intratumoral, intraperitoneal, or intravenous injection. Such compositions would normally be administered as pharmaceutically acceptable compositions, described supra.

The active compounds may also be administered parenterally or intraperitoneally. Solutions of the active compounds as free base or pharmacologically acceptable salts can be prepared in water suitably mixed with a surfactant, such as hydroxypropylcellulose.

Dispersions can also be prepared in glycerol, liquid polyethylene glycols, and mixtures thereof and in oils. Under ordinary conditions of storage and use, these preparations contain a preservative to prevent the growth of microorganisms.

The pharmaceutical forms suitable for injectable use include sterile aqueous solutions or dispersions and sterile powders for the extemporaneous preparation of sterile injectable solutions or dispersions. In all cases, the form must be sterile and must be fluid to the extent that easy syringability exists. It must be stable under the conditions of manufacture and storage and must be preserved against the contaminating action of microorganisms, such as bacteria and fungi. The carrier can be a solvent or dispersion medium containing, for example, water, ethanol, polyol (for example, glycerol, propylene glycol, and liquid polyethylene glycol, and the like), suitable mixtures thereof, and vegetable oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride.

Prolonged absorption of the injectable compositions can be brought about by the use in the compositions of agents delaying absorption, for example, aluminum monostearate and gelatin.

Sterile injectable solutions are prepared by incorporating the active compounds in the required amount in the appropriate solvent with several of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

As used herein, "pharmaceutically acceptable carrier" includes any and all solvents, dispersion media, coatings, antibacterial and antifungal agents, isotonic and absorption delaying agents and the like. The use of such media and agents for pharmaceutical active substances is well known in the art. Except insofar as any conventional media or agent is incompatible with the active ingredient, its use in the therapeutic compositions is contemplated. Supplementary active ingredients can also be incorporated into the compositions.

For oral administration, the inhibitors of the nucleotidyltransferase superfamily enzymes of the present disclosure may be incorporated with excipients and used in the form of non-ingestible mouthwashes and dentifrices. A mouthwash may be prepared incorporating the active ingredient in the required amount in an appropriate solvent, such as a sodium borate solution (Dobell's Solution). Alternatively, the active ingredient may be incorporated into an antiseptic wash containing sodium borate, glycerin and potassium bicarbonate. The active ingredient may also be dispersed in dentifrices, including: gels, pastes, powders and slurries. The active ingredient may be added in a therapeutically effective amount to a paste dentifrice that may include water, binders, abrasives, flavoring agents, foaming agents, and humectants.

The compositions of the present disclosure may be formulated in a neutral or salt form. Pharmaceutically-acceptable salts include the acid addition salts and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine, and the like.

Upon formulation, solutions will be administered in a manner compatible with the dosage formulation and in such amount as is therapeutically effective. The formulations are easily administered in a variety of dosage forms such as injectable solutions, drug release capsules and the like. For parenteral administration in an aqueous solution, for example, the solution should be suitably buffered if necessary and the liquid diluent first rendered isotonic with sufficient saline or glucose. These particular aqueous solutions are especially suitable for intravenous, intramuscular, subcutaneous and intraperitoneal administration. In this connection, sterile aqueous media which can be employed will be known to those of skill in the art in light of the present disclosure. For example, one dosage could be dissolved in 1 ml of isotonic NaCl solution and either added to 1000 ml of hypodermoclysis fluid or injected at the proposed site of infusion, (see for example, "Remington's Pharmaceutical Sciences," 15th Edition, pages 1035-1038 and 1570-1580). Some variation in dosage will necessarily occur depending on the condition of the subject being treated. The person responsible for administration will, in any event, determine the appropriate dose for the individual subject. Moreover, for human administration, preparations should meet sterility, pyrogenicity, general safety and purity standards as required by FDA's Division of Biological Standards and Quality Control of the Office of Compliance and Biologics Quality.

B. Methods of Treatment

In particular, the compositions that may be used in treating bacterial infections in a subject (e.g., a human subject) are disclosed herein. The compositions described above are preferably administered to a mammal (e.g., rodent, human, non-human primates, canine, bovine, ovine, equine, feline, etc.) in an effective amount, that is, an amount capable of producing a desirable result in a treated subject (e.g., killing bacterial cells). Toxicity and therapeutic efficacy of the compositions utilized in methods of the disclosure can be determined by standard pharmaceutical procedures. As is well known in the medical and veterinary arts, dosage for any one animal depends on many factors, including the subject's size, body surface area, body weight, age, the particular composition to be administered, time and route of administration, general health, the clinical symptoms of the infection and other drugs being administered concurrently. A composition as described herein is typically administered at a dosage that inhibits the growth or proliferation of a bacterial cell or inhibits the growth of a biofilm, as assayed by identifying a reduction in hematological parameters (complete blood count—CBC) or proliferation of the bacterial cells. In some embodiments, amounts of the inhibitors of the nucleotidyltransferase superfamily enzymes used to inhibit bacterial growth is calculated to be from about 0.01 mg to about 10,000 mg/day. In some embodiments, the amount is from about 1 mg to about 1,000 mg/day. In some embodiments, these dosings may be reduced or increased based upon the biological factors of a particular patient such as increased or decreased metabolic breakdown of the drug or decreased uptake by the digestive tract if administered orally. Additionally, the inhibitors of the nucleotidyltransferase superfamily enzymes may be more efficacious and thus a smaller dose is required to achieve a similar effect. Such a dose is typically administered once a day for a few weeks or until sufficient reducing in the number of bacteria present has been achieved.

The therapeutic methods of the disclosure (which include prophylactic treatment) in general include administration of a therapeutically effective amount of the compositions described herein to a subject in need thereof, including a mammal, particularly a human. Such treatment will be suitably administered to subjects, particularly humans, suffering from, having, susceptible to, or at risk for a disease, disorder, or symptom thereof. Determination of those subjects "at risk" can be made by any objective or subjective determination by a diagnostic test or opinion of a subject or health care provider (e.g., genetic test, enzyme or protein marker, marker (as defined herein), family history, and the like).

In one embodiment, the disclosure provides a method of monitoring treatment progress. The method includes the step of determining a level of changes in hematological parameters in which the subject has been administered a therapeutic amount of a composition as described herein. The level of marker determined in the method can be compared to known levels of marker either in healthy normal controls or in other afflicted patients to establish the subject's disease status. In preferred embodiments, a second level of marker in the subject is determined at a time point later than the determination of the first level, and the two levels are compared to monitor the course of disease or the efficacy of the therapy. In certain preferred embodiments, a pre-treatment level of marker in the subject is determined prior to beginning treatment according to the methods described herein; this pre-treatment level of marker can then be compared to the level of marker in the subject after the treatment commences, to determine the efficacy of the treatment.

C. Combination Therapies

It is envisioned that the inhibitors of the nucleotidyltransferase superfamily enzymes may be used in combination therapies with an additional antimicrobial agent such as an antibiotic or a compound which mitigates one or more of the side effects experienced by the patient. The following is a general discussion of therapies that may be used in conjunction with the therapies of the present disclosure.

To treat bacterial infection using the methods and compositions of the present disclosure, one may contact a subject with a compound and at least one other therapy. These therapies would be provided in a combined amount effective to achieve a reduction in one or more disease parameter(s). This process may involve contacting the cells/subjects with the both agents/therapies at the same time, e.g., using a single composition or pharmacological formulation that includes both agents, or by contacting the cell/subject with two distinct compositions or formulations, at the same time, wherein one composition includes the compound and the other includes the other agent.

Alternatively, the inhibitors of the nucleotidyltransferase superfamily enzymes may precede or follow the other treatment by intervals ranging from minutes to weeks. One would generally ensure that a significant period of time did not expire between the time of each delivery, such that the therapies would still be able to exert an advantageously combined effect on the cell/subject. In such instances, it is contemplated that one would contact the cell with both modalities within about 12-24 hours of each other, within about 6-12 hours of each other, or with a delay time of only about 12 hours. In some situations, it may be desirable to extend the time period for treatment significantly; however, where several days (2, 3, 4, 5, 6 or 7) to several weeks (1, 2, 3, 4, 5, 6, 7 or 8) lapse between the respective administrations.

It also is conceivable that more than one administration of either the compound or the other therapy will be desired. Various combinations may be employed, where a compound of the present disclosure is "A," and the other therapy is "B," as exemplified below:

A/B/A B/A/B B/B/A A/A/B B/A/A A/B/B B/B/B/A B/B/A/B
A/A/B/B A/B/A/B A/B/B/A B/B/A/A B/A/B/A B/A/A/B B/B/B/A
A/A/A/B B/A/A/A A/B/A/A A/A/B/A A/B/B/B B/A/B/B B/B/A/B

Agents or factors suitable for use in a combined therapy with agents according to the present disclosure against an infectious disease include antibiotics such as penicillins, cephalosporins, carbapenems, macrolides, aminoglycosides, quinolones (including fluoroquinolones), sulfonamides and tetracylcines. Other combinations are contemplated. The following is a general discussion of antibiotic therapies that may be used combination with the compounds of the present disclosure.

The term "antibiotics" are drugs which may be used to treat a bacterial infection through either inhibiting the growth of bacteria or killing bacteria. Without being bound by theory, it is believed that antibiotics can be classified into two major classes: bactericidal agents that kill bacteria or bacteriostatic agents that slow down or prevent the growth of bacteria.

The first commercially available antibiotic was released in the 1930's. Since then, many different antibiotics have been developed and widely prescribed. In 2010, on average, 4 in 5 Americans are prescribed antibiotics annually. Given the prevalence of antibiotics, bacteria have started to develop resistance to specific antibiotics and antibiotic mechanisms. Without being bound by theory, the use of antibiotics in combination with another antibiotic may modulate resistance and enhance the efficacy of one or both agents.

In some embodiments, antibiotics can fall into a wide range of classes. In some embodiments, the compounds of the present disclosure may be used in conjunction with another antibiotic. In some embodiments, the compounds may be used in conjunction with a narrow spectrum antibiotic which targets a specific bacteria type. In some non-limiting examples of bactericidal antibiotics include penicillin, cephalosporin, polymyxin, rifamycin, lipiarmycin, quinolones, and sulfonamides. In some non-limiting examples of bacteriostatic antibiotics include macrolides, lincosamides, or tetracyclines. In some embodiments, the antibiotic is an aminoglycoside such as kanamycin and streptomycin, an ansamycin such as rifaximin and geldanamycin, a carbacephem such as loracarbef, a carbapenem such as ertapenem, imipenem, a cephalosporin such as cephalexin, cefixime, cefepime, and ceftobiprole, a glycopeptide such as vancomycin or teicoplanin, a lincosamide such as lincomycin and clindamycin, a lipopeptide such as daptomycin, a macrolide such as clarithromycin, spiramycin, azithromycin, and telithromycin, a monobactam such as aztreonam, a nitrofuran such as furazolidone and nitrofurantoin, an oxazolidonones such as linezolid, a penicillin such as amoxicillin, azlocillin, flucloxacillin, and penicillin G, an antibiotic polypeptide such as bacitracin, polymyxin B, and colistin, a quinolone such as ciprofloxacin, levofloxacin, and gatifloxacin, a sulfonamide such as silver sulfadiazine, mefenide, sulfadimethoxine, or sulfasalazine, or a tetracycline such as demeclocycline, doxycycline, minocycline, oxytetracycline, or tetracycline. In some embodiments, the compounds could be combined with a drug which acts against mycobacteria such as cycloserine, capreomycin, ethionamide, rifampicin, rifabutin, rifapentine, and streptomycin. Other antibiotics that are contemplated for combination therapies may include arsphenamine, chloramphenicol, fosfomycin, fusidic acid, metronidazole, mupirocin, platensimycin, quinupristin, dalfopristin, thiamphenicol, tigecycline, tinidazole, or trimethoprim.

IV. CHEMICAL DEFINITIONS

When used in the context of a chemical group: "hydrogen" means —H; "hydroxy" means —OH; "oxo" means =O; "carbonyl" means —C(=O)—; "carboxy" means —C(=O)OH (also written as —COOH or —CO$_2$H); "halo" means independently —F, —Cl, —Br or —I; "amino" means —NH$_2$; "hydroxyamino" means —NHOH; "nitro" means —NO$_2$; imino means =NH; "cyano" means —CN; "isocyanate" means —N=C=O; "azido" means —N$_3$; in a monovalent context "phosphate" means —OP(O)(OH)$_2$ or a deprotonated form thereof; in a divalent context "phosphate" means —OP(O)(OH)O— or a deprotonated form thereof; "mercapto" means —SH; and "thio" means =S; "sulfonyl" means —S(O)$_2$—; and "sulfinyl" means —S(O)—.

In the context of chemical formulas, the symbol "—" means a single bond, "=" means a double bond, and "≡" means triple bond. The symbol "----" represents an optional bond, which if present is either single or double. The symbol "⚌" represents a single bond or a double bond. Thus, the formula

covers, for example,

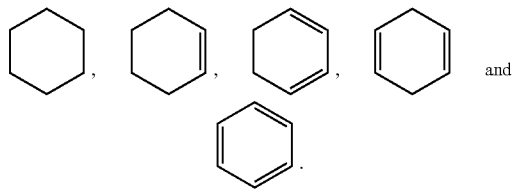

And it is understood that no one such ring atom forms part of more than one double bond. Furthermore, it is noted that the covalent bond symbol "—", when connecting one or two stereogenic atoms, does not indicate any preferred stereochemistry. Instead, it covers all stereoisomers as well as mixtures thereof. The symbol "⌇", when drawn perpendicularly across a bond (e.g.,

for methyl) indicates a point of attachment of the group. It is noted that the point of attachment is typically only identified in this manner for larger groups in order to assist the reader in unambiguously identifying a point of attachment. The symbol "—◄■" means a single bond where the group attached to the thick end of the wedge is "out of the page." The symbol "⦀⦀⦀⦀" means a single bond where the group attached to the thick end of the wedge is "into the page". The symbol "⟿" means a single bond where the geometry around a double bond (e.g., either E or Z) is undefined. Both options, as well as combinations thereof are therefore intended. Any undefined valency on an atom of a structure shown in this application implicitly represents a hydrogen atom bonded to that atom. A bold dot on a carbon atom indicates that the hydrogen attached to that carbon is oriented out of the plane of the paper.

When a variable is depicted as a "floating group" on a ring system, for example, the group "R" in the formula:

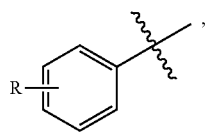

then the variable may replace any hydrogen atom attached to any of the ring atoms, including a depicted, implied, or expressly defined hydrogen, so long as a stable structure is formed. When a variable is depicted as a "floating group" on a fused ring system, as for example the group "R" in the formula:

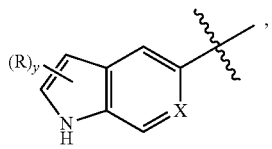

then the variable may replace any hydrogen attached to any of the ring atoms of either of the fused rings unless specified otherwise. Replaceable hydrogens include depicted hydrogens (e.g., the hydrogen attached to the nitrogen in the formula above), implied hydrogens (e.g., a hydrogen of the formula above that is not shown but understood to be present), expressly defined hydrogens, and optional hydrogens whose presence depends on the identity of a ring atom (e.g., a hydrogen attached to group X, when X equals —CH—), so long as a stable structure is formed. In the example depicted, R may reside on either the 5-membered or the 6-membered ring of the fused ring system. In the formula above, the subscript letter "y" immediately following the R enclosed in parentheses, represents a numeric variable. Unless specified otherwise, this variable can be 0, 1, 2, or any integer greater than 2, only limited by the maximum number of replaceable hydrogen atoms of the ring or ring system.

For the chemical groups and compound classes, the number of carbon atoms in the group or class is as indicated as follows: "Cn" defines the exact number (n) of carbon atoms in the group/class. "C≤n" defines the maximum number (n) of carbon atoms that can be in the group/class, with the minimum number as small as possible for the group/class in question, e.g., it is understood that the minimum number of carbon atoms in the group "alkenyl$_{(C≤8)}$" or the class "alkene$_{(C≤8)}$" is two. Compare with "alkoxy$_{(C≤10)}$", which designates alkoxy groups having from 1 to 10 carbon atoms. "Cn-n'" defines both the minimum (n) and maximum number (n') of carbon atoms in the group. Thus, "alkyl$_{(C2≤10)}$" designates those alkyl groups having from 2 to 10 carbon atoms. These carbon number indicators may precede or follow the chemical groups or class it modifies and it may or may not be enclosed in parenthesis, without signifying any change in meaning. Thus, the terms "C5 olefin", "C5-olefin", "olefin$_{(C5)}$", and "olefin$_{C5}$" are all synonymous. When any of the chemical groups or compound classes defined herein is modified by the term "substituted", any carbon atom(s) in the moiety replacing a hydrogen atom is not counted. Thus methoxyhexyl, which has a total of seven carbon atoms, is an example of a substituted alkyl$_{(C1-6)}$. Unless specified otherwise, any chemical group or compound class listed in a claim set without a carbon atom limit has a carbon atom limit of less than or equal to twelve.

The term "saturated" when used to modify a compound or chemical group means the compound or chemical group has no carbon-carbon double and no carbon-carbon triple bonds, except as noted below. When the term is used to modify an atom, it means that the atom is not part of any double or triple bond. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded. When the term "saturated" is used to modify a solution of a substance, it means that no more of that substance can dissolve in that solution.

The term "aliphatic" when used without the "substituted" modifier signifies that the compound or chemical group so modified is an acyclic or cyclic, but non-aromatic hydrocarbon compound or group. In aliphatic compounds/groups, the carbon atoms can be joined together in straight chains, branched chains, or non-aromatic rings (alicyclic). Aliphatic compounds/groups can be saturated, that is joined by single carbon-carbon bonds (alkanes/alkyl), or unsaturated, with one or more carbon-carbon double bonds (alkenes/alkenyl) or with one or more carbon-carbon triple bonds (alkynes/alkynyl).

The term "aromatic" when used to modify a compound or a chemical group refers to a planar unsaturated ring of atoms with 4n+2 electrons in a fully conjugated cyclic π system.

The term "alkyl" when used without the "substituted" modifier refers to a monovalent saturated aliphatic group with a carbon atom as the point of attachment, a linear or branched acyclic structure, and no atoms other than carbon and hydrogen. The groups —CH$_3$ (Me), —CH$_2$CH$_3$ (Et), —CH$_2$CH$_2$CH$_3$ (n-Pr or propyl), —CH(CH$_3$)$_2$ (i-Pr, $^i$Pr or isopropyl), —CH$_2$CH$_2$CH$_2$CH$_3$ (n-Bu), —CH(CH$_3$) CH$_2$CH$_3$ (sec-butyl), —CH$_2$CH(CH$_3$)$_2$ (isobutyl), —C(CH$_3$)$_3$ (tert-butyl, t-butyl, t-Bu or $^t$Bu), and —CH$_2$C (CH$_3$)$_3$ (neo-pentyl) are non-limiting examples of alkyl groups. The term "alkanediyl" when used without the "substituted" modifier refers to a divalent saturated aliphatic group, with one or two saturated carbon atom(s) as the point(s) of attachment, a linear or branched acyclic structure, no carbon-carbon double or triple bonds, and no atoms other than carbon and hydrogen. The groups —CH$_2$— (methylene), —CH$_2$CH$_2$—, —CH$_2$C(CH$_3$)$_2$CH$_2$—, and —CH$_2$CH$_2$CH$_2$— are non-limiting examples of alkanediyl groups. The term "alkylidene" when used without the "substituted" modifier refers to the divalent group =CRR' in which R and R' are independently hydrogen or alkyl. Non-limiting examples of alkylidene groups include: =CH$_2$, =CH(CH$_2$CH$_3$), and =C(CH$_3$)$_2$. An "alkane" refers to the class of compounds having the formula H—R, wherein R is alkyl as this term is defined above. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$. The following groups are non-limiting examples of substituted alkyl groups: —CH$_2$OH, —CH$_2$Cl, —CF$_3$, —CH$_2$CN, —CH$_2$C(O)OH, —CH$_2$C(O)OCH$_3$, —CH$_2$C(O)NH$_2$, —CH$_2$C(O)CH$_3$, —CH$_2$OCH$_3$, —CH$_2$OC(O)CH$_3$, —CH$_2$NH$_2$, —CH$_2$N(CH$_3$)$_2$, and —CH$_2$CH$_2$Cl. The term "haloalkyl" is a subset of substituted alkyl, in which the hydrogen atom replacement is limited to halo (i.e. —F, —Cl, —Br, or —I) such that no other atoms aside from carbon, hydrogen and halogen are present. The group, —CH$_2$Cl is a non-limiting example of a haloalkyl. The term "fluoroalkyl" is a subset of substituted alkyl, in which the hydrogen atom replacement is limited to fluoro such that no other atoms aside from carbon, hydrogen and fluorine are present. The groups —CH$_2$F, —CF$_3$, and —CH$_2$CF$_3$ are non-limiting examples of fluoroalkyl groups.

The term "cycloalkyl" when used without the "substituted" modifier refers to a monovalent saturated aliphatic group with a carbon atom as the point of attachment, said carbon atom forming part of one or more non-aromatic ring structures, no carbon-carbon double or triple bonds, and no atoms other than carbon and hydrogen. Non-limiting examples include: —CH(CH$_2$)$_2$ (cyclopropyl), cyclobutyl, cyclopentyl, or cyclohexyl (Cy). As used herein, the term does not preclude the presence of one or more alkyl groups (carbon number limitation permitting) attached to a carbon atom of the non-aromatic ring structure. The term "cycloalkanediyl" when used without the "substituted" modifier refers to a divalent saturated aliphatic group with two carbon atoms as points of attachment, no carbon-carbon double or triple bonds, and no atoms other than carbon and hydrogen. The group

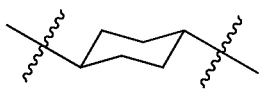 [SMILES: *C1CCC(*)CC1]

is a non-limiting example of cycloalkanediyl group. A "cycloalkane" refers to the class of compounds having the formula H—R, wherein R is cycloalkyl as this term is defined above. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$.

The term "alkenyl" when used without the "substituted" modifier refers to a monovalent unsaturated aliphatic group with a carbon atom as the point of attachment, a linear or branched, acyclic structure, at least one nonaromatic carbon-carbon double bond, no carbon-carbon triple bonds, and no atoms other than carbon and hydrogen. Non-limiting examples include: —CH=CH$_2$ (vinyl), —CH=CHCH$_3$, —CH=CHCH$_2$CH$_3$, —CH$_2$CH=CH$_2$ (allyl), —CH$_2$CH=CHCH$_3$, and —CH=CHCH=CH$_2$. The term "alkenediyl" when used without the "substituted" modifier refers to a divalent unsaturated aliphatic group, with two carbon atoms as points of attachment, a linear or branched, a linear or branched acyclic structure, at least one nonaromatic carbon-carbon double bond, no carbon-carbon triple bonds, and no atoms other than carbon and hydrogen. The groups —CH=CH—, —CH=C(CH$_3$)CH$_2$—, —CH=CHCH$_2$—, and —CH$_2$CH=CHCH$_2$— are non-limiting examples of alkenediyl groups. It is noted that while the alkenediyl group is aliphatic, once connected at both ends, this group is not precluded from forming part of an aromatic structure. The terms "alkene" and "olefin" are synonymous and refer to the class of compounds having the formula H—R, wherein R is alkenyl as this term is defined above. Similarly, the terms "terminal alkene" and "α-olefin" are synonymous and refer to an alkene having just one carbon-carbon double bond, wherein that bond is part of a vinyl group at an end of the molecule. When any of these terms are used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$. The groups —CH=CHF, —CH=CHCl and —CH=CHBr are non-limiting examples of substituted alkenyl groups.

The term "alkynyl" when used without the "substituted" modifier refers to a monovalent unsaturated aliphatic group with a carbon atom as the point of attachment, a linear or branched acyclic structure, at least one carbon-carbon triple bond, and no atoms other than carbon and hydrogen. As used herein, the term alkynyl does not preclude the presence of one or more non-aromatic carbon-carbon double bonds. The groups —C≡CH, —C≡CCH$_3$, and —CH$_2$C≡CCH$_3$ are non-limiting examples of alkynyl groups. An "alkyne" refers to the class of compounds having the formula H—R, wherein R is alkynyl. When any of these terms are used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$.

The term "aryl" when used without the "substituted" modifier refers to a monovalent unsaturated aromatic group with an aromatic carbon atom as the point of attachment, said carbon atom forming part of a one or more aromatic ring structure, wherein the ring atoms are all carbon, and wherein the group consists of no atoms other than carbon and hydrogen. If more than one ring is present, the rings may be fused or unfused. Unfused rings are connected with a covalent bond. As used herein, the term aryl does not preclude the presence of one or more alkyl groups (carbon number limitation permitting) attached to the first aromatic ring or any additional aromatic ring present. Non-limiting examples of aryl groups include phenyl (Ph), methylphenyl, (dimethyl)phenyl, —C$_6$H$_4$CH$_2$CH$_3$ (ethylphenyl), naphthyl, and a monovalent group derived from biphenyl (e.g., 4-phenylphenyl). The term "arenediyl" when used without the "substituted" modifier refers to a divalent aromatic group with two aromatic carbon atoms as points of attachment, said carbon atoms forming part of one or more six-membered aromatic ring structure(s) wherein the ring atoms are all carbon, and wherein the monovalent group consists of no atoms other than carbon and hydrogen. As used herein, the term arenediyl does not preclude the presence of one or more alkyl groups (carbon number limitation permitting) attached to the first aromatic ring or any additional aromatic ring present. If more than one ring is present, the rings may be fused or unfused. Unfused rings are connected with a covalent bond. Non-limiting examples of arenediyl groups include:

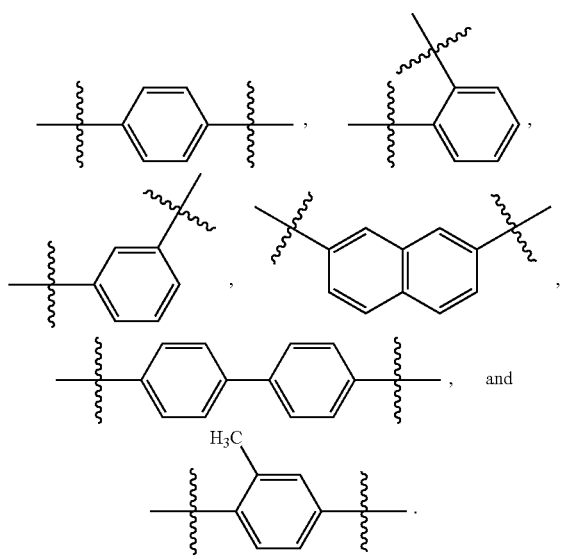

An "arene" refers to the class of compounds having the formula H—R, wherein R is aryl as that term is defined above. Benzene and toluene are non-limiting examples of arenes. When any of these terms are used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$.

The term "aralkyl" when used without the "substituted" modifier refers to the monovalent group -alkanediyl-aryl, in which the terms alkanediyl and aryl are each used in a manner consistent with the definitions provided above. Non-limiting examples are: phenylmethyl (benzyl, Bn) and 2-phenyl-ethyl. When the term aralkyl is used with the "substituted" modifier one or more hydrogen atom from the alkanediyl and/or the aryl group has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$. Non-limiting examples of substituted aralkyls are: (3-chlorophenyl)-methyl, and 2-chloro-2-phenyl-eth-1-yl.

The term "heteroaryl" when used without the "substituted" modifier refers to a monovalent aromatic group with an aromatic carbon atom or nitrogen atom as the point of attachment, said carbon atom or nitrogen atom forming part of one or more aromatic ring structures wherein at least one of the ring atoms is nitrogen, oxygen or sulfur, and wherein the heteroaryl group consists of no atoms other than carbon, hydrogen, aromatic nitrogen, aromatic oxygen and aromatic sulfur. If more than one ring is present, the rings may be fused or unfused.

Unfused rings are connected with a covalent bond. As used herein, the term heteroaryl does not preclude the presence of one or more alkyl or aryl groups (carbon number limitation permitting) attached to the aromatic ring or aromatic ring system. Non-limiting examples of heteroaryl groups include furanyl, imidazolyl, indolyl, indazolyl (Im), isoxazolyl, methylpyridinyl, oxazolyl, phenylpyridinyl, pyridinyl (pyridyl), pyrrolyl, pyrimidinyl, pyrazinyl, quinolyl, quinazolyl, quinoxalinyl, triazinyl, tetrazolyl, thiazolyl, thienyl, and triazolyl. The term "N-heteroaryl" refers to a heteroaryl group with a nitrogen atom as the point of attachment. A "heteroarene" refers to the class of compounds having the formula H—R, wherein R is heteroaryl. Pyridine and quinoline are non-limiting examples of heteroarenes. When these terms are used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$.

The term "heterocycloalkyl" when used without the "substituted" modifier refers to a monovalent non-aromatic group with a carbon atom or nitrogen atom as the point of attachment, said carbon atom or nitrogen atom forming part of one or more non-aromatic ring structures wherein at least one of the ring atoms is nitrogen, oxygen or sulfur, and wherein the heterocycloalkyl group consists of no atoms other than carbon, hydrogen, nitrogen, oxygen and sulfur. If more than one ring is present, the rings may be fused or unfused. As used herein, the term does not preclude the presence of one or more alkyl groups (carbon number limitation permitting) attached to the ring or ring system. Also, the term does not preclude the presence of one or more double bonds in the ring or ring system, provided that the resulting group remains non-aromatic. Non-limiting examples of heterocycloalkyl groups include aziridinyl, azetidinyl, pyrrolidinyl, piperidinyl, piperazinyl, morpholinyl, thiomorpholinyl, tetrahydrofuranyl, tetrahydrothiofuranyl, tetrahydropyranyl, pyranyl, oxiranyl, and oxetanyl. The term "N-heterocycloalkyl" refers to a heterocycloalkyl group with a nitrogen atom as the point of attachment. N-pyrrolidinyl is an example of such a group. When these terms are used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$.

The term "acyl" when used without the "substituted" modifier refers to the group —C(O)R, in which R is a hydrogen, alkyl, cycloalkyl, aryl, or aralkyl as those terms are defined above. The groups, —CHO, —C(O)CH$_3$ (acetyl, Ac), —C(O)CH$_2$CH$_3$, —C(O)CH(CH$_3$)$_2$, —C(O)CH(CH$_2$)$_2$, —C(O)C$_6$H$_5$, and —C(O)C$_6$H$_4$CH$_3$ are non-limiting examples of acyl groups. A "thioacyl" is defined in an analogous manner, except that the oxygen atom of the group —C(O)R has been replaced with a sulfur atom, —C(S)R. The term "aldehyde" corresponds to an alkyl group, as defined above, attached to a —CHO group. When any of these terms are used with the "substituted" modifier one or more hydrogen atom (including a hydrogen atom directly attached to the carbon atom of the carbonyl or thiocarbonyl group, if any) has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$. The groups, —C(O)CH$_2$CF$_3$, —CO$_2$H (carboxyl), —CO$_2$CH$_3$ (methylcarboxyl), —CO$_2$CH$_2$CH$_3$, —C(O)NH$_2$ (carbamoyl), and —CON(CH$_3$)$_2$, are non-limiting examples of substituted acyl groups.

The term "alkoxy" when used without the "substituted" modifier refers to the group —OR, in which R is an alkyl, as that term is defined above. Non-limiting examples include: —OCH$_3$ (methoxy), —OCH$_2$CH$_3$ (ethoxy), —OCH$_2$CH$_2$CH$_3$, —OCH(CH$_3$)$_2$ (isopropoxy), or —OC(CH$_3$)$_3$ (tert-butoxy). The terms "cycloalkoxy", "alkenyloxy", "alkynyloxy", "aryloxy", "aralkoxy", "heteroaryloxy", "heterocycloalkoxy", and "acyloxy", when used without the "substituted" modifier, refers to groups, defined as —OR, in which R is cycloalkyl, alkenyl, alkynyl, aryl, aralkyl, heteroaryl, heterocycloalkyl, and acyl, respectively. The term "alkylthio" and "acylthio" when used without the "substituted" modifier refers to the group —SR, in which R is an alkyl and acyl, respectively. The term "alcohol" corresponds to an alkane, as defined above, wherein at least one of the hydrogen atoms has been replaced with a hydroxy group. The term "ether" corresponds to an alkane, as defined above, wherein at least one of the hydrogen atoms has been replaced with an alkoxy group. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$.

The term "alkylamino" when used without the "substituted" modifier refers to the group —NHR, in which R is an alkyl, as that term is defined above. Non-limiting examples include: —NHCH$_3$ and —NHCH$_2$CH$_3$. The term "dialkylamino" when used without the "substituted" modifier refers to the group —NRR', in which R and R' can be the same or different alkyl groups, or R and R' can be taken together to represent an alkanediyl. Non-limiting examples of dialkylamino groups include: —N(CH$_3$)$_2$ and —N(CH$_3$)(CH$_2$CH$_3$). The terms "cycloalkylamino", "alkenylamino", "alkynylamino", "arylamino", "aralkylamino", "heteroarylamino", "heterocycloalkylamino", "alkoxyamino", and "alkylsulfonylamino" when used without the "substituted" modifier, refers to groups, defined as —NHR, in which R is cycloalkyl, alkenyl, alkynyl, aryl, aralkyl, heteroaryl, heterocycloalkyl, alkoxy, and alkylsulfonyl, respectively. A non-limiting example of an arylamino group is —NHC$_6$H$_5$. The term "amido" (acylamino), when used without the "substituted" modifier, refers to the group —NHR, in which R is acyl, as that term is defined above. A non-limiting example of an amido group is —NHC(O)CH$_3$. The term "alkylimino" when used without the "substituted" modifier refers to the divalent group =NR, in which R is an alkyl, as that term is defined above. When any of these terms is used with the "substituted" modifier one or more hydrogen atom attached to a carbon atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$OH, or —S(O)$_2$NH$_2$. The groups —NHC(O)OCH$_3$ and —NHC(O)NHCH$_3$ are non-limiting examples of substituted amido groups.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects.

An "active ingredient" (AI) (also referred to as an active compound, active substance, active agent, pharmaceutical agent, agent, biologically active molecule, or a therapeutic compound) is the ingredient in a pharmaceutical drug or a pesticide that is biologically active. The similar terms active pharmaceutical ingredient (API) and bulk active are also used in medicine, and the term active substance may be used for pesticide formulations.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result. "Effective amount," "Therapeutically effective amount" or "pharmaceutically effective amount" when used in the context of treating a patient or subject with a compound means that amount of the compound which, when administered to a subject or patient for treating or preventing a disease, is an amount sufficient to effect such treatment or prevention of the disease.

An "excipient" is a pharmaceutically acceptable substance formulated along with the active ingredient(s) of a medication, pharmaceutical composition, formulation, or drug delivery system. Excipients may be used, for example, to stabilize the composition, to bulk up the composition (thus often referred to as "bulking agents," "fillers," or "diluents" when used for this purpose), or to confer a therapeutic enhancement on the active ingredient in the final dosage form, such as facilitating drug absorption, reducing viscosity, or enhancing solubility. Excipients include pharmaceutically acceptable versions of antiadherents, binders, coatings, colors, disintegrants, flavors, glidants, lubricants, preservatives, sorbents, sweeteners, and vehicles. The main excipient that serves as a medium for conveying the active ingredient is usually called the vehicle. Excipients may also be used in the manufacturing process, for example, to aid in the handling of the active substance, such as by facilitating powder flowability or non-stick properties, in addition to aiding in vitro stability such as prevention of denaturation or aggregation over the expected shelf life. The suitability of an excipient will typically vary depending on the route of administration, the dosage form, the active ingredient, as well as other factors.

The term "hydrate" when used as a modifier to a compound means that the compound has less than one (e.g., hemihydrate), one (e.g., monohydrate), or more than one (e.g., dihydrate) water molecules associated with each compound molecule, such as in solid forms of the compound.

As used herein, the term "IC$_{50}$" refers to an inhibitory dose which is 50% of the maximum response obtained. This quantitative measure indicates how much of a particular drug or other substance (inhibitor) is needed to inhibit a given biological, biochemical or chemical process (or component of a process, i.e. an enzyme, cell, cell receptor or microorganism) by half.

An "isomer" of a first compound is a separate compound in which each molecule contains the same constituent atoms as the first compound, but where the configuration of those atoms in three dimensions differs.

As used herein, the term "patient" or "subject" refers to a living mammalian organism, such as a human, monkey, cow, sheep, goat, dog, cat, mouse, rat, guinea pig, or transgenic species thereof. In certain embodiments, the patient or subject is a primate. Non-limiting examples of human patients are adults, juveniles, infants and fetuses.

As generally used herein "pharmaceutically acceptable" refers to those compounds, materials, compositions, and/or dosage forms which are, within the scope of sound medical judgment, suitable for use in contact with the tissues, organs, and/or bodily fluids of human beings and animals without excessive toxicity, irritation, allergic response, or other problems or complications commensurate with a reasonable benefit/risk ratio.

"Pharmaceutically acceptable salts" means salts of compounds of the present disclosure which are pharmaceutically acceptable, as defined above, and which possess the desired pharmacological activity. Such salts include acid addition salts formed with inorganic acids such as hydrochloric acid, hydrobromic acid, sulfuric acid, nitric acid, phosphoric acid, and the like; or with organic acids such as 1,2-ethanedisulfonic acid, 2-hydroxyethanesulfonic acid, 2-naphthalenesulfonic acid, 3-phenylpropionic acid, 4,4'-methylenebis(3-hydroxy-2-ene-1-carboxylic acid), 4-methylbicyclo[2.2.2]oct-2-ene-1-carboxylic acid, acetic acid, aliphatic mono- and dicarboxylic acids, aliphatic sulfuric acids, aromatic sulfuric acids, benzenesulfonic acid, benzoic acid, camphorsulfonic acid, carbonic acid, cinnamic acid, citric acid, cyclopentanepropionic acid, ethanesulfonic acid, fumaric acid, glucoheptonic acid, gluconic acid, glutamic acid, glycolic acid, heptanoic acid, hexanoic acid, hydroxynaphthoic acid, lactic acid, laurylsulfuric acid, maleic acid, malic acid, malonic acid, mandelic acid, methanesulfonic acid, muconic acid, o-(4-hydroxybenzoyl)benzoic acid, oxalic acid, p-chlorobenzenesulfonic acid, phenyl-substituted alkanoic acids, propionic acid, p-toluenesulfonic acid, pyruvic acid, salicylic acid, stearic acid, succinic acid, tartaric acid, tertiarybutylacetic acid, trimethylacetic acid, and the like. Pharmaceutically acceptable salts also include base addition salts which may be formed when acidic protons present are capable of reacting with inorganic or organic bases. Acceptable inorganic bases include sodium hydroxide, sodium carbonate, potassium hydroxide, aluminum hydroxide and calcium hydroxide. Acceptable organic bases include ethanolamine, diethanolamine, triethanolamine, tromethamine, N-methylglucamine and the like. It should be recognized that the particular anion or cation forming a part of any salt of this disclsoure is not critical, so long as the salt, as a whole, is pharmacologically acceptable. Additional examples of pharmaceutically acceptable salts and their methods of preparation and use are presented in *Handbook of Pharmaceutical Salts: Properties, and Use* (P. H. Stahl & C. G. Wermuth eds., Verlag Helvetica Chimica Acta, 2002).

A "pharmaceutically acceptable carrier," "drug carrier," or simply "carrier" is a pharmaceutically acceptable substance formulated along with the active ingredient medication that is involved in carrying, delivering and/or transporting a chemical agent. Drug carriers may be used to improve the delivery and the effectiveness of drugs, including for example, controlled-release technology to modulate drug bioavailability, decrease drug metabolism, and/or reduce drug toxicity. Some drug carriers may increase the effectiveness of drug delivery to the specific target sites. Examples of carriers include: liposomes, microspheres (e.g., made of poly(lactic-co-glycolic) acid), albumin microspheres, synthetic polymers, nanofibers, protein-DNA complexes, protein conjugates, erythrocytes, virosomes, and dendrimers.

A "pharmaceutical drug" (also referred to as a pharmaceutical, pharmaceutical agent, pharmaceutical preparation, pharmaceutical composition, pharmaceutical formulation, pharmaceutical product, medicinal product, medicine, medication, medicament, or simply a drug) is a drug used to diagnose, cure, treat, or prevent disease. An active ingredient (AI) (defined above) is the ingredient in a pharmaceutical drug or a pesticide that is biologically active. The similar terms active pharmaceutical ingredient (API) and bulk active are also used in medicine, and the term active substance may be used for pesticide formulations. Some medications and pesticide products may contain more than one active ingredient. In contrast with the active ingredients, the inactive ingredients are usually called excipients (defined above) in pharmaceutical contexts.

"Prevention" or "preventing" includes: (1) inhibiting the onset of a disease in a subject or patient which may be at risk and/or predisposed to the disease but does not yet experience or display any or all of the pathology or symptomatology of the disease, and/or (2) slowing the onset of the pathology or symptomatology of a disease in a subject or patient which may be at risk and/or predisposed to the disease but does not yet experience or display any or all of the pathology or symptomatology of the disease.

"Prodrug" means a compound that is convertible in vivo metabolically into an inhibitor according to the present disclsoure. The prodrug itself may or may not also have activity with respect to a given target protein. For example, a compound comprising a hydroxy group may be administered as an ester that is converted by hydrolysis in vivo to the hydroxy compound. Suitable esters that may be converted in vivo into hydroxy compounds include acetates, citrates, lactates, phosphates, tartrates, malonates, oxalates, salicylates, propionates, succinates, fumarates, maleates, methylene-bis-β-hydroxynaphthoate, gentisates, isethionates, di-p-toluoyltartrates, methanesulfonates, ethanesulfonates, benzenesulfonates, p-toluenesulfonates, cyclohexylsulfamates, quinates, esters of amino acids, and the like. Similarly, a compound comprising an amine group may be administered as an amide that is converted by hydrolysis in vivo to the amine compound.

A "stereoisomer" or "optical isomer" is an isomer of a given compound in which the same atoms are bonded to the same other atoms, but where the configuration of those atoms in three dimensions differs. "Enantiomers" are stereoisomers of a given compound that are mirror images of each other, like left and right hands. "Diastereomers" are stereoisomers of a given compound that are not enantiomers. Chiral molecules contain a chiral center, also referred to as a stereocenter or stereogenic center, which is any point, though not necessarily an atom, in a molecule bearing groups such that an interchanging of any two groups leads to a stereoisomer. In organic compounds, the chiral center is typically a carbon, phosphorus or sulfur atom, though it is also possible for other atoms to be stereocenters in organic and inorganic compounds. A molecule can have multiple stereocenters, giving it many stereoisomers. In compounds whose stereoisomerism is due to tetrahedral stereogenic centers (e.g., tetrahedral carbon), the total number of hypothetically possible stereoisomers will not exceed $2^n$, where n is the number of tetrahedral stereocenters. Molecules with symmetry frequently have fewer than the maximum possible number of stereoisomers. A 50:50 mixture of enantiomers is referred to as a racemic mixture. Alternatively, a mixture of enantiomers can be enantiomerically enriched so that one enantiomer is present in an amount greater than 50%. Typically, enantiomers and/or diastereomers can be resolved or separated using techniques known in the art. It is contemplated that that for any stereocenter or axis of chirality for which stereochemistry has not been defined, that stereocenter or axis of chirality can be present in its R form, S form, or as a mixture of the R and S forms, including racemic and non-racemic mixtures. As used herein, the phrase "substantially free from other stereoisomers" means that the composition contains ≤15%, more preferably ≤10%, even more preferably ≤5%, or most preferably ≤1% of another stereoisomer(s).

"Treatment" or "treating" includes (1) inhibiting a disease in a subject or patient experiencing or displaying the pathology or symptomatology of the disease (e.g., arresting further development of the pathology and/or symptomatology), (2) ameliorating a disease in a subject or patient that is experiencing or displaying the pathology or symptomatology of the disease (e.g., reversing the pathology and/or symptomatology), and/or (3) effecting any measurable decrease in a disease in a subject or patient that is experiencing or displaying the pathology or symptomatology of the disease.

The above definitions supersede any conflicting definition in any reference that is incorporated by reference herein. The fact that certain terms are defined, however, should not be considered as indicative that any term that is undefined is indefinite. Rather, all terms used are believed to describe the disclsoure in terms such that one of ordinary skill can appreciate the scope and practice the present disclsoure.

V. EXAMPLES

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1—Biological Activity

A. Primary Inhibitor Screening

Bacterial growth inhibition was measured to test whether a compound had antibiotic activity. In the preliminary screening, three compound concentrations were used: 5.8 µM, 20.4 M and 71.4 µM. Bacteria tested included *E. coli* (ATCC 35218), *Staphylococcus saprophyticus* (*S. saprophyticus*, ATCC BAA-750), *Acinetobacter baumannii* (*A. baumannii*, Abl, from a patient) and *Pseudomonas aeruginosa* (*Ps. Aeruginosa*, ATCC 27853). 391 NTS compounds were screened against *E. coli* and *S. saprophyticus* and 389 compounds were screened against *A. baumannii* and *Ps. aeruginosa*. The compounds (stocks at 10 mM in 100% DMSO) were diluted in Mueller-Hinton II broth (MHB). Overnight bacterial culture was added to the diluted compounds in a 96 well plate ($5 \times 10^5$ CFU/mL inoculum for each well). After 16-24 hours incubation at 35° C.+2° C., the turbidity in the cultures was read at 630 nM in microplate reader (17). FIG. 1 shows selected data from primary inhibitory screening. Table 1 summarizes all primary screening results. As shown in Table 1, 0.5%, 5.4%, 20.5% of the compounds inhibited *S. saprophyticus* growth and 0%, 1.5%, 6.1% of the compounds inhibited *E. coli* growth by ≥80% compared to vehicle-treated controls at 5.8 µM, 20.4 µM, and 71.4 µM, respectively. Only 06.2% compounds inhibited *A. baumannii* growth by ≥80% compared to vehicle-treated controls at 71.4 µM. No compounds could inhibit *P. aeruginosa*>80% at 71.4 µM. Compound #67 (Ciprofloxacin) is a FDA-approved antibiotic and was used as positive control in the screening. As illustrated in FIG. 1, #67 completely inhibited *E. coli, S. saprophyticus* and *Ps. Aeruginosa*'s growth. However, for *A. baumannii*, modest inhibition can be seen at 71.4 µM. This is because the *A. baumannii* employed in this study is from a patient and it is a multi-drug resistant (MDR) strain.

To summarize the primary screening data: The primary screening showed that some of the NTS compounds do have antibacterial activities, especially for gram positive bacteria.

B. Quantitative Inhibition Assays

To further characterize the compounds, the minimal inhibitory concentration ($MIC_{80}$) were determined for selected compounds. $MIC_{80}$ is defined as the compound concentration at which ≥80% bacterial growth is inhibited compare to untreated controls. Meanwhile, for the selected compounds, cytotoxicity assays ($CC_{50}$) were performed on a HepG2-derived hepatoblastoma cell line (HEPDES19). The compounds selected for these cytotoxicity assays were those that showed ≥80% inhibition of *E. coli* or *S. saprophyticus* at <20.4 µM, and ≥80% inhibition on *A. baumannii* at <71.4 µM in the preliminary screening. For the $MIC_{80}$ measurements, a 1.5 fold dilution series of the compounds was prepared in Mueller-Hinton II broth. Overnight bacterial culture was added to the diluted compounds in a 96 well plate after adjusting the concentration. After 16-24 hours' incubation at 35° C.+2° C., the plates were read at 630 nM in microplate reader. For $CC_{50}$ evaluation, soluble tetrazolium dye (MTS) was used to measure mitochondrial toxicity in a human hepatoblastoma cell line (18). The bacteria (*E. coli, S. saprophyticus* and *A. baumannii*) used in $MIC_{80}$ measurements were the same as that in the primary screening, but for *Staphylococcus, S. aureus* is used primarily because it is a common pathogen in Staphylococcaeae family, while *S. saprophyticus* is part of the normal human flora. *S. aureus* (ATCC 29213) is methicillin-sensitive *Staphylococcus aureus* (MSSA) strain and it was used as a model strain to measure the $MIC_{80}$. As shown in Table 2, the $MIC_{80}$ for compounds #43, 46, 51, 53, 54, 62, 63, 75, 114, 120, 140, 146, 146, 154, 261, 262, 282, 283, 284, 285, 332, 338, 350, 364, 432, 681, 682 and 688 against *S. aureus* and/or *S. saprophyticus* were <20 µM. For *E. coli* the best inhibition was with compounds #154, 261, 284, 308, 310, 311, 322, 363, 364 441, 676, 677, 678, 680, 681, 684 and 685, in which the $MIC_{80}$ were <30 µM. For *A. baumannii*, compound #261, 272 and 310 had >80% inhibition with $MIC_{80}$<30 µM.

TABLE 1

Percentage of compounds that can inhibit bacteria growth ≥80% compare to un-treatment control.

| Organism | Compounds concentration (μM) | ≤5.8 | 5.8-20.4 | 20.4-71.4 |
|---|---|---|---|---|
| Staph. saprophyticus | Percentage of compounds (%) | 2.0 (5/254) | 3.5 (9/254) | 11.8 (30/254) |
| E. coli | Percentage of compounds (%) | 0 | 2.0 (5/254) | 7.9 (20/254) |
| Pseudomonas aeruginosa | Percentage of compounds (%) | 0 | 0 | 1.5 (4/259) |
| Acinetobacter baumannii | Percentage of compounds (%) | 0 | 0 | 10 (26/259) |

As shown in Table 2, among the compounds inhibited *S. aureus* and/or *S. saprophyticus* at concentration<20 μM, or inhibited *E. coli* and *A. banmannii* at concentration<30 μM, compounds #46, 75, 114, 120, 140, 146, 149, 154272, 308, 311, 332, 350, 677, 678, 681, 684, 685, 688 had the $CC_{50}$ values that were lower than 50 μM, while compounds #43, 51, 53, 54, 62, 63, 261, 262, 282, 283, 284, 285, 310, 322, 338, 363, 364, 680, 682 and 690 had $CC_{50}$ values>50 μM (most of them >100 μM), therefore, they are potential candidates for development as antibiotics. The $CC_{50}$ values for compounds #432 and 441 are not yet available.

TABLE 2

$MIC_{80}$ on *E. coli*, *S. Saprophyticus*, *S. aureus* and *A. baumannii* and $CC_{50}$ for selected compounds.

| Componds# | S. aureus | S. sapro | E. coli | A. baumannii | $CC_{50}$ (μM) |
|---|---|---|---|---|---|
| 43 | 13.2 | 11.4 | 111.1 | | 100 |
| 46 | 19.8 | 29.6 | 44.4 | 100 | 25 |
| 51 | 16.5 | 15.1 | 166.7 | | 56 |
| 53 | 11.7 | 8.8 | >100 | | 100 |
| 54 | 16.1 | 14.9 | 70.4 | 44.4 | 96 |
| 62 | 19.8 | 10.3 | 111.1 | 83.4 | 99 |
| 63 | 16.5 | 9.2 | 111.1 | 83.4 | 100 |
| 67 | <2.6 | <2.9 | <2.9 | | |
| 75 | 8.8 | 15.1 | 100 | | 28 |
| 114 | 19.8 | | | | 38 |
| 120 | 19.8 | | 44.4 | 83.4 | 42 |
| 140 | 3.9 | 12.7 | >100 | | 42 |
| 146 | 19.8 | | | | 20 |
| 149 | | 2.5 | >100 | | 8 |
| 154 | | 17.8 | 21.9 | | 4 |
| 261 | 17.6 | 37 | 19.8 | 29.6 | 56 |
| 262 | 19.8 | 19.8 | 66.7 | 100 | 57 |
| 272 | | | 44.4 | 29.6 | 10 |
| 282 | 18.2 | | >100 | | 97 |
| 283 | 15.4 | | >100 | | 100 |
| 284 | 15 | 44.4 | 24.1 | 55.6 | 91 |
| 285 | 10.3 | | 100 | 44.4 | 100 |
| 308 | 44.4 | 29.6 | 24.7 | 32.1 | 26 |
| 310 | | 44.4 | 29.6 | 29.6 | 73 |
| 311 | 66.7 | | 29.6 | 44.4 | 32 |
| 322 | | | 29.6 | >100 | 100 |
| 332 | 19.8 | | | | 38 |
| 338 | 19.8 | | | | 109 |
| 350 | 2.6 | | 100 | 100 | 45 |
| 363 | 31.2 | | 29.6 | >100 | 109 |
| 364 | 13.2 | | 19.8 | | 67 |
| 432 | 13.2 | | | | |
| 441 | | | 13.2 | | |
| 677 | >100 | | 19.8 | | 8.7 |
| 678 | 29.6 | | 19.8 | | 34.8 |
| 680 | 29.6 | | 19.8 | >100 | |
| 681 | 19.8 | | 19.8 | | 20.6 |
| 682 | 19.8 | | 66.7 | | 82.9 |
| 684 | 44.4 | | 13.2 | | 23.6 |
| 685 | >100 | | 19.8 | | 12.9 |
| 688 | 11.6 | | >100 | | 27.5 |
| 690 | 5.9 | | >100 | | 73 |

*Compounds inhibited *S. aureus* and/or *S. saprophyticus* at concentration <20 μM, or inhibited *E. coli* and *A. banmannii* at concentration <30 μM.

C. Inhibition of Compounds #63 and #285 on the Other Gram Positive ATCC Strains, MRSA and MRCNS Next, the top 2 primary hits, #63 and #285, were tested against *S. Saprophyticus* and *S. aureus* based on $MIC_{80}$ and $CC_{50}$ to determine if they inhibit the other *S. aureus* ATCC strains and methicillin-resistant *Staphylococcus aureus* (MRSA) collected from the BSL-2 Microbiology laboratory at the John Cochran division of the St. Louis VA Health care system (STLVAHCS) under STLVAHCS Subcommittee on Research Safety (SRS)-approved protocols. All the MRSA strains (from Sa1 to Sa23, except for Sa 4 and Sa13) are cefoxitin-screen positive (resistant to cefoxitin) and resistant to oxacillin. As shown in Table 3, the $MIC_{80}$ of compounds #63 and #285 on *S. aureus* ATCC strains and clinical MRSA strains ranged from 5.9 μM-13.2 μM, similar to that in MSSA strain *S. aureus* described above. In addition to resistant to oxacillin, 16/21 MRSA strains were also resistant to the fluoroquinolone class antibiotic ciprofloxacin (compound #67), 12/21 were resistant to protein synthesis inhibitor class antibiotic clindamycin, 1/21 were resistant to the DNA-dependent RNA polymerase inhibitor class antibiotic rifampicin and 2/21 were resistant to the folate synthesis inhibitor class antibiotic trimethoprim/sulfamethoxazole. Compound #63 and #285 had similar potency in all drug-resistant *S. aureus* strains, indicating that compound #63 and #285 have different target from the existing antibiotics mentioned above.

TABLE 3

MIC$_{80}$ on *S. aureus* ATCC strains, MRSA and some coagulase negative *Staphylococcus* for compound #63 and #285.

| Bacteria Strains | FOX screen | OXA | GEN | CIP | LVX | MXF | ICR | ERY | CLI | LZD |
|---|---|---|---|---|---|---|---|---|---|---|
| ATCC BAA 1026 | POS | R | R | R | R | I | NEG | R | R | S |
| ATCC 25923 | Neg | S | S | S | S | S | NEG | S | S | S |
| ATCC BAA 976 | POS | R | S | S | S | S | NEG | R | S | S |
| ATCC BAA 977 | Neg | S | S | S | S | S | POS | R | R | S |
| ATCC 29213 | Neg | S | S | S | S | S | NEG | S | S | S |
| Sa1 | POS | R | S | R | R | R | POS | R | R | S |
| Sa2 | POS | R | S | R | R | I | NEG | R | S | S |
| Sa3 | POS | R | S | R | R | I | NEG | R | R | S |
| Sa5 | | R | S | R | | R | | R | R | S |
| Sa6 | POS | R | S | R | R | R | POS | R | R | S |
| Sa7 | POS | R | S | S | S | S | NEG | R | S | S |
| Sa8 | | R | S | R | | R | | R | S | S |
| Sa9 | POS | R | S | R | R | R | POS | R | R | S |
| Sa10 | | R | S | R | | R | | R | R | S |
| Sa11 | POS | R | S | R | R | R | NEG | R | R | S |
| Sa12 | POS | R | S | R | R | I | NEG | R | R | S |
| Sa14 | POS | R | S | R | R | I | NEG | R | R | S |
| Sa15 | POS | R | S | R | R | R | NEG | R | R | S |
| Sa16 | POS | R | S | R | R | I | NEG | R | R | S |
| Sa17 | POS | R | S | R | R | R | NEG | R | S | S |
| Sa18 | POS | R | S | R | R | I | NEG | R | S | S |
| Sa19 | POS | R | S | S | S | S | POS | R | R | S |
| Sa20 | POS | R | S | R | R | I | NEG | R | S | S |
| Sa21 | POS | R | S | S | S | S | NEG | R | S | S |
| Sa22 | POS | R | S | S | S | S | NEG | R | S | S |
| Sa23 | POS | R | S | S | S | S | NEG | R | S | S |
| Se1 | POS | R | S | R | R | R | NEG | S | R | S |
| Se2 | POS | R | S | S | S | S | NEG | R | R | S |
| Se3 | POS | R | R | R | R | R | NEG | R | R | S |
| Se4 | POS | R | R | R | R | R | NEG | R | R | S |
| Se5 | POS | R | I | R | R | R | NEG | R | R | S |
| Sh1 | POS | R | S | R | R | R | NEG | R | S | S |
| Sh2 | POS | R | S | S | S | S | NEG | S | S | S |
| Sh3 | POS | R | S | S | S | S | POS | R | R | S |
| CNS1 | POS | R | S | S | S | S | POS | I | R | S |
| CNS2 | POS | R | S | R | R | R | NEG | S | S | S |

| Bacteria Strains | Antibiotics | | | | | | | | Compounds MIC80 (μM) | |
|---|---|---|---|---|---|---|---|---|---|---|
| | DAP | VAN | DOX | TET | TGC | NIT | RIF | SXT | #63 | #285 |
| ATCC BAA 1026 | S | S | S | S | S | S | S | R | | |
| ATCC 25923 | S | S | S | S | S | S | S | S | 8.8 | 8.8 |
| ATCC BAA 976 | S | S | S | S | S | S | S | S | 13.2 | 8.8 |
| ATCC BAA 977 | S | S | S | S | S | S | S | S | 8.8 | 8.8 |
| ATCC 29213 | S | S | S | S | S | S | S | S | 8.8 | 8.8 |
| Sa1 | S | S | S | S | S | S | S | R | 8.8 | 8.8 |
| Sa2 | S | S | S | S | S | S | S | S | 8.8 | 8.8 |
| Sa3 | S | S | S | S | S | S | S | S | 8.8 | 8.8 |
| Sa5 | | S | | S | | | | S | 8.8 | 8.8 |
| Sa6 | S | S | S | S | S | S | S | S | 8.8 | 8.8 |
| Sa7 | S | S | S | S | S | S | S | S | 8.8 | 8.8 |
| Sa8 | | S | | | | | | S | 8.8 | 8.8 |
| Sa9 | S | S | S | S | S | S | S | | 8.8 | 8.8 |
| Sa10 | | S | | | | | | S | 8.8 | 8.8 |
| Sa11 | S | S | S | S | S | S | S | S | 8.8 | 8.8 |
| Sa12 | S | S | S | S | S | S | S | S | 8.8 | 8.8 |
| Sa14 | | S | S | S | S | S | S | S | 8.8 | 8.8 |
| Sa15 | S | S | S | S | S | S | R | R | 8.8 | 5.9 |
| Sa16 | S | S | S | S | S | S | S | S | 8.8 | 8.8 |
| Sa17 | S | S | S | S | S | S | S | S | 8.8 | 8.8 |
| Sa18 | S | S | S | S | S | S | S | S | 8.8 | 8.8 |
| Sa19 | S | S | S | S | S | S | S | S | 8.8 | 8.8 |
| Sa20 | S | S | S | S | S | S | S | S | 8.8 | 13.2 |
| Sa21 | S | S | S | S | S | S | S | S | 8.8 | 5.9 |
| Sa22 | S | S | S | S | S | S | S | S | 8.8 | 5.9 |
| Sa23 | S | S | S | S | S | S | S | S | 8.8 | 8.8 |
| Se1 | S | S | S | S | S | S | S | R | 8.8 | 8.8 |
| Se2 | S | S | S | S | S | S | S | R | 8.8 | 6.6 |
| Se3 | S | S | S | S | S | S | S | R | 8.8 | 6.6 |
| Se4 | S | S | S | S | S | S | S | R | 8.8 | 9.9 |

TABLE 3-continued

MIC$_{80}$ on *S. aureus* ATCC strains, MRSA and some coagulase negative *Staphylococcus* for compound #63 and #285.

| Se5 | S | S | S | S | S | S | S | R | 8.8 | 9.9 |
|---|---|---|---|---|---|---|---|---|---|---|
| Sh1 | S | S | S | R | S | S | S | R | 8.8 | 9.9 |
| Sh2 | S | S | R | R | S | S | S | S | 13.2 | 9.9 |
| Sh3 | S | S | S | S | S | S | S | S | 8.8 | 6.6 |
| CNS1 | S | S | S | S | S | S | S | S | 13.2 | 9.9 |
| CNS2 | S | S | S | S | S | S | S | S | 5.9 | 6.6 |

R: resistance;
S: Sensitive;
I: intermediate.
Sa: MRSA.
Se: *Staphylococcus epidermidis*;
Sh: *Staphylococcus hominis*;
CNS: Coagulase negative *Staphylococcus* Cefoxitin (FOX);
Oxacillin (OXA);
Gentamicin (GEN);
Ciprofloxacin (CIP);
levofloxacin (LVX);
moxifloxacin (MXF);
Inducible Clindamycin Resistance (ICR);
erythromycin (ERY);
clindamycin (CLI);
linezolid (LZD);
daptomycin (DAP);
vancomycin (VAN);
doxycycline (DOX);
Tetracycline (TET);
Tigecycline (TGC);
Nitrofurantoin (NIT);
Rifampin (RIF).
Trimethoprim-Sulfamethoxazole (SXT)

It was also tested whether compounds #63 and #285 can inhibit other coagulase-negative *Staphylococcus* (CNS) including *S. epidermidis*, *S. hominis*, etc. Again, all these bacterial strains were collected from patients under SRS-approved conditions and are methicillin-resistant along with other drug-resistance, including gentamicin, ciprofloxacin, erythromycin, clindamycin, tetracycline, trimethoprim/sulfamethoxazole. As shown in Table 3, compounds #63 and #285 inhibited all these drug-resistant CNS strains with similar MIC$_{80}$ values as against the MSSA strains.

D. Inhibition of compounds #261, #284, #322, #363 and #364 on MDR Gram-Negative Strains For the *E. coli* inhibitor compounds #284, #322, #363 and #364, it was tested whether they could inhibit other multi-drug resistant (MDR) Enterobacteriaceae. All these MDR-bacteria are at least resistant to two classes of the antibiotics among five groups and/or specific antibiotics including quinolones/fluorquinolones, carbapenems, cephalosporins, aminoglycosides and piperacillin-tazobactam. As shown in Table 4, compound #284 inhibited 4/5 of the MDR *E. coli* (Ec1-Ec4) strains, one *Citrobacter koseri* (Ck1) strain, one *Enterobacter cloacae* complex (Ecc1) strain, one *Morganella morganii* (Mm1) strain, and one *Klebsiella pneumoniae* (Kp1) strain with MIC$_{80}$ values≤20 μM. #363 and #364 are two analogs of #284, and they also inhibited some of MDR Enterobacteriaceae with MIC$_{80}$≤20 μM. No obvious inhibition was seen for compound #322, except for one MDR *E. coli* and one *Enterobacter cloacae* complex strain, in which the MIC$_{80}$ were 44.4 μM and 66.7 μM respectively. For *A. baumanni* inhibitor #261, it was also tested if it could inhibit the other MDR *A. baumanni* strains. As showed in Table 4, compound #261 inhibited 3/5 of MDR *A. baumanni* with MIC$_{80}$≤20 μM.

TABLE 4

MIC$_{80}$ on MDR Enterobacteriaceae for compound #284, #322, #363, #364 and on MDR *Acinetobacter baumannii* for compound #261.

| Bacteria Strains | Antibiotics | | | | | | | | | | | |
|---|---|---|---|---|---|---|---|---|---|---|---|---|
| | ESBL | AMP | AMC | SAM | TZP | CFZ | CAZ | CRO | FEP | ETP | IPM | MEM |
| Ec1 | POS | R | S | R | S | R | R | R | R | S | S | S |
| Ec2 | POS | R | S | I | S | R | R | R | R | S | S | S |
| Ec3 | POS | R | S | I | S | R | R | R | R | S | S | S |
| Ec4 | POS | R | S | R | S | R | R | R | R | S | S | S |
| Ec5 | POS | R | I | R | S | R | R | R | R | S | S | S |
| Ck1 | | | I | | I | R | R | S | S | S | S | S |
| Ecc1 | | | R | | R | R | R | S | S | S | S | S |
| Mm1 | | R | R | R | S | R | R | I | S | S | S | |
| Kp1 | POS | R | S | R | S | R | R | R | R | S | S | S |
| Kp6 | POS | R | I | R | R | R | R | R | R | S | S | |
| Ab1 | | R | R | S | | R | R | R | R | | S | |
| Ab2 | | R | R | S | | R | R | R | R | | I | |
| Ab3 | | R | R | S | R | R | R | R | R | | I | |

TABLE 4-continued

MIC$_{80}$ on MDR Enterobacteriaceae for compound #284, #322, #363, #364 and on MDR *Acinetobacter baumannii* for compound #261.

| Ab4 | R | R | S | R | R | R | R |   | I |
| Ab5 | R | S | I | R | R | R | R |   | R |

| Bacteria | Antibiotics | | | | | | Compounds MIC$_{80}$ (μM) | | | | |
| --- | --- | --- | --- | --- | --- | --- | --- | --- | --- | --- | --- |
| Strains | GEN | TOB | CIP | LVX | NIT | SXT | #284 | #322 | #363 | #364 | #261 |
| Ec1 | R | I | S | S | S | R | 5.9 | >100 | 22.2 | 33.3 | |
| Ec2 | R | I | R | R | S | R | 3.9 | 66.7 | 9.8 | 14.8 | |
| Ec3 | R | I | S | S | S | R | 5.9 | >100 | 9.8 | 22.2 | |
| Ec4 | S | R | R | R | S | S | 8.8 | >100 | 14.8 | 33.3 | |
| Ec5 | S | R | R | R | S | R | 29.6 | >100 | | | |
| Ck1 | R | I | R | I | R | R | 8.8 | >100 | 14.8 | 33.3 | |
| Ecc1 | R | S | S | S | S | S | 8.8 | 44.4 | 14.8 | 33.3 | |
| Mm1 | R | I | R | R | R | R | 19.8 | >100 | >33.3 | >33.3 | |
| Kp1 | S | S | S | S | S | R | 5.9 | >100 | >33.3 | >33.3 | |
| Kp6 | S | R | R | R | R | R | 29.6 | >100 | >33.3 | >33.3 | |
| Ab1 | S | S | R | R | R | R | | | | | 29.6 |
| Ab2 | R | S | R | I | R | R | | | | | 19.8 |
| Ab3 | R | S | R | R | R | R | | | | | 19.8 |
| Ab4 | R | S | R | R | R | R | | | | | 19.8 |
| Ab5 | R | I | R | R | R | R | | | | | 29.6 |

R: resistance;
S: Sensitive;
I: intermediate.
Ec: *E. coli*;
Ck: *Citrobacter koseri*;
Ecc: *Enterobacter cloacae* complex;
Mm: *Morganella morganii*;
Kp: *Klebsiella pneumonia*;
Ab: *Acinetobacter baumannii*.
Extended Spectrum Beta-Lactamases (ESBL);
Ampicillin (AMP);
Amoxicillin-clavulanic acid (AMC);
Ampicillin-Sulbactam (SAM);
Piperacillin-tazobactam (TZP);
Cefazolin (CFZ);
Ceftazidime (CAZ);
Ceftriaxone (CRO);
Cefepime (FEP);
Ertapenem (ETP);
Imipenem (IPM);
Meropenem (MEM);
Gentamicin (GEN);
Tobramycin (TOB);
Ciprofloxacin (CIP);
Levofloxacin (LVX);
Nitrofurantoin (NIT);
Trimethoprim-Sulfamethoxazole (SXT).

E. Structures of the inhibitors

Scheme 1 shows the structures of compounds that inhibited ≥80% growth of *S. aureus* and/or *S. saprophyticus* at <20 μM, and ≥80% inhibition on *E. coli* and *A. baumannii* at <30 μM. These compounds include quinolonic acid-like (#67, 322), tropolone (#53, 54, 350), tropones (363, 690), α-hydroxytropolones (#46, 114, 120, 146, 261, 262, 272, 308, 310, 311, 332, 338), benzoylated tropolones (#51, 62, 63, 282, 283, 284, 285, 364, 677, 678, 680, 681, 682, 684, 685, 688), elvitagravir derivatives (#75, 140), ciclopirox-like (#43), napthyridinone-like (#149, 154) and quinolinone (432, and 441) compounds. #67 is a positive control, which can inhibit *S. saprophyticus* (ATCC BAA-750), *S. aureus* (ATCC 29213), *E. coli* (ATCC35218) and *Ps. aeruginosa* (ATCC 27853) with MIC$_{80}$<2.9 μM. However, for *Acinetobacter baumannii* (Ab1), #67 only modestly inhibited it (FIG. 1) because it is a MDR isolate from a patient. However, another quinolone derivative #322 only modestly inhibited *E. coli*.

Overall, compounds 46, 75, 114, 120, 140, 146, 149, 154272, 308, 311, 332, 350, 677, 678, 681, 684, 685, 688 exhibited antibacterial activity; however, their CC$_{50}$ values were lower than 50 μM indicating that they may have a limited therapeutic window in patients without chemical optimization. Compound #322, the analog of ciprofloxacin (#67), is not a good candidate for drug development because its potency is low and/or the resistance on bacteria is already seen (quinolone resistance). For compounds ##43, 51, 53, 54, 62, 63, 261, 262, 282, 283, 284, 285, 310, 322, 338, 363, 364, 680, 682 and 690 their CC$_{50}$ values were >50 μM (most of them >100 μM), therefore, they are may be candidates for development as antibiotics.

-continued

67

<2.6 µM (Sa)
<2.9 µM (Ss)
<2.9 µM (Ec)

322

29.6 µM (Sa)
>100 µM (Ab)
100 µM (CC60)

53

11.7 µM (Sa)
8.8 µM (Ss)
>100 (Ec)
100 µM (CC50)

54

16.1 µM (Sa)
14.9 µM (Ss)
70.4 (Ec)
44.4 µM (Ab)
96 µM (CC50)

350

2.6 µM (Sa)
100 µM (Ec)
100 µM (Ab)
45 µM (CC50)

363

31.2 µM (Sa)
29.6 (Ec)
>100 µM (Ab)
109 µM (CC50)

390

5.9 µM (Sa)
>100 µM (Ec)
73 µM (CC50)

46

19.8 µM (Sa)
29.6 µM (Ss)
44.4 µM (Ec)
100 µM (Ab)
25 µM (CC50)

114

19.8 µM (Sa)
38 µM (CC50)

120

19.8 µM (Sa)
44.4 µM (Ec)
33.4 µM (Ab)
42 µM (CC50)

-continued
146
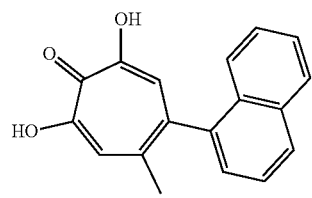
19.8 µM (Sa)
21 µM (CC$_{50}$)
261
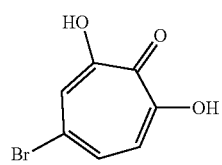
17.6 µM (Sa)
37 µM (Ss)
19.8 µM (Ec)
29.6 µM (Ab)
66 µM (CC$_{50}$)
262
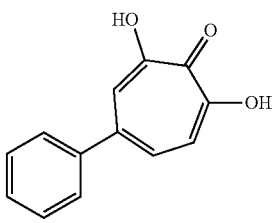
19.8 µM (Sa)
19.8 µM (Ss)
66.7 µM (Ec)
100 µM (Ab)
57 µM (CC$_{50}$)
272
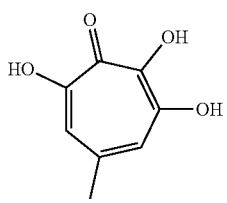
44.4 µM (Ec)
29.6 µM (Ab)
10 µM (CC$_{50}$)
308
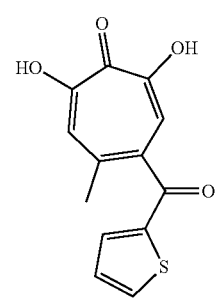
44.4 µM (Sa)
29.6 µM (Ss)
24.7 µM (Ec)
32.1 µM (Ab)
26 µM (CC$_{50}$)
-continued
310
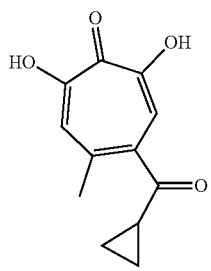
44.4 µM (Sa)
29.6 µM (Ec)
29.6 µM (Ab)
73 µM (CC$_{50}$)
311
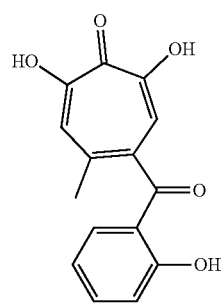
66.7 µM (Sa)
29.6 µM (Ec)
44.4 µM (Ab)
32 µM (CC$_{50}$)
332
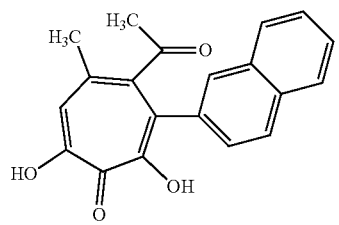
19.8 µM (Sa)
38 µM (CC$_{50}$)
338
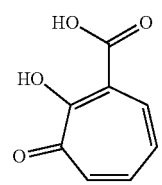
19.8 µM (Sa)
109 µM (CC$_{50}$)

51
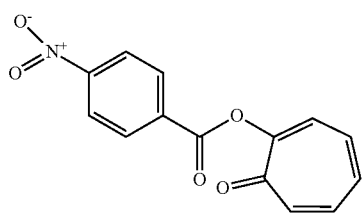
16.5 µM (Sa)
15.1 µM (Ss)
>100 µM (Ec)
56 µM (CC$_{50}$)
62
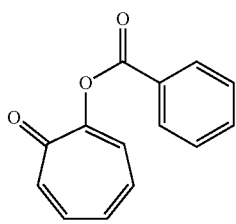
19.8 µM (Sa)
10.3 µM (Ss)
>100 µM (Ec)
83.4 µM (Ab)
99 µM (CC$_{50}$)
63
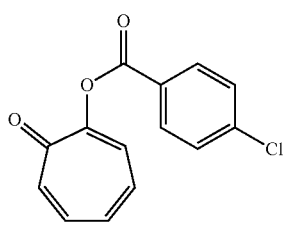
16.5 µM (Sa)
9.2 µM (Ss)
>100 µM (Ec)
83.4 µM (Ab)
100 µM (CC$_{50}$)
282
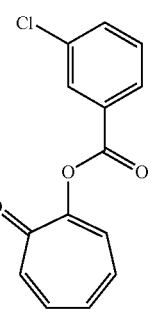
18.2 µM (Sa)
>100 µM (Ec)
100 µM (CC$_{50}$)
283
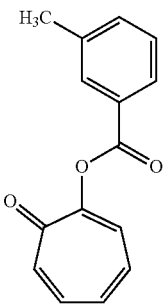
15.4 µM (Sa)
>100 µM (Ec)
100 µM (CC$_{50}$)
284
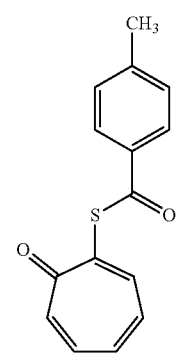
15 µM (Sa)
44.4 µM (Ss)
24.1 µM (Ec)
55.6 µM (Ab)
91 µM (CC$_{50}$)
285
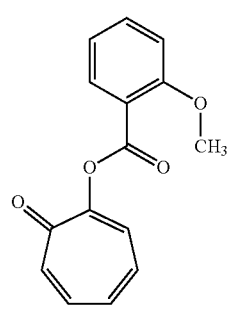
10.3 µM (Sa)
100 µM (Ec)
44.4 µM (Ab)
100 µM (CC$_{50}$)
364
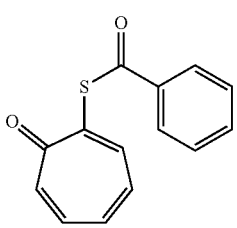
13.2 µM (Sa)
19.8 µM (Ec)
67 µM (CC$_{50}$)

577
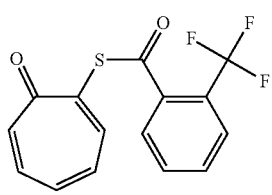
>100 µM (Sa)
19.8 µM (Ec)
8.7 µM (CC50)
578
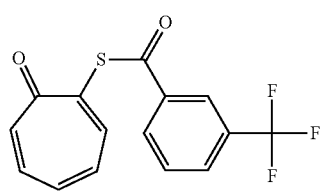
29.8 µM (Sa)
19.8 µM (Ec)
34.8 µM (CC50)
580
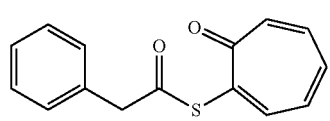
29.8 µM (Sa)
19.8 µM (Ec)
>100 µM (CC50)
581
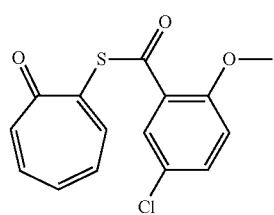
19.8 µM (Sa)
19.8 µM (Ec)
20.6 µM (CC50)
552
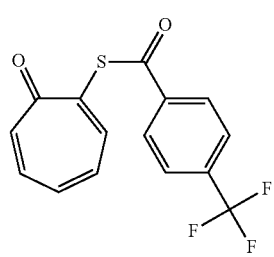
19.8 µM (Sa)
88.7 µM (Ec)
82.9 µM (CC50)
554
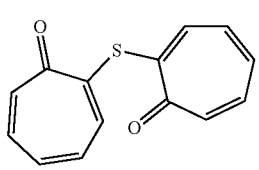
44.4 µM (Sa)
13.2 µM (Ec)
23.6 µM (CC50)
555
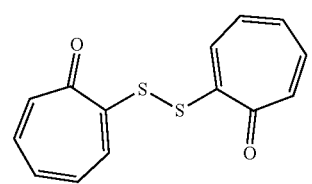
>100 µM (Sa)
19.8 µM (Ec)
12.9 µM (CC50)
555
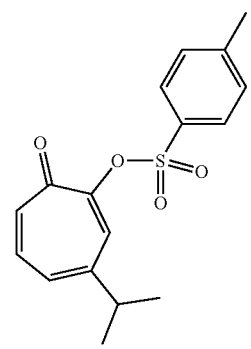
11.8 µM (Sa)
>100 µM (Ec)
27.5 µM (CC50)
75
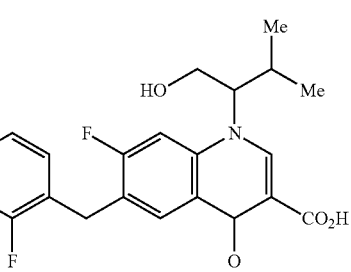
8.8 µM (Sa)
15.1 µM (Ss)
100 µM (Ec)
27.5 µM (CC50)

-continued

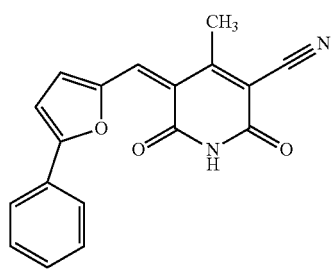

3.9 µM (Sa)
12.7 µM (Ss)
>100 µM (Ec)
42 µM (CC$_{50}$)

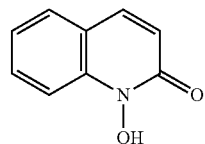

13.2 µM (Sa)
11.4 µM (Ss)
>100 µM (Ec)
100 µM (CC$_{50}$)

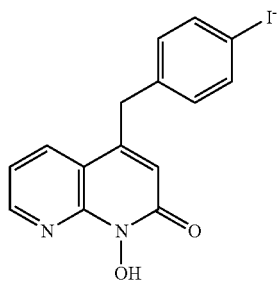

2.5 µM (Ss)
>100 µM (Ec)
8 µM (CC$_{50}$)

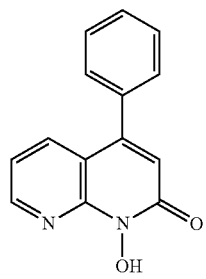

17.8 µM (Ss)
21.9 µM (Ec)
4 µM (CC$_{50}$)

-continued

432

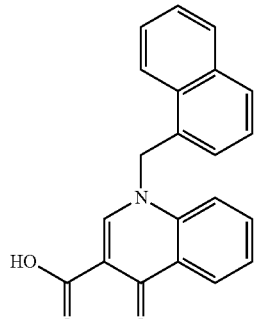

13.2 µM (Sa)

441

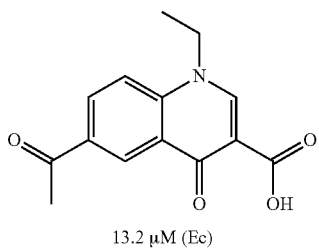

13.2 µM (Ec)

Structures of compounds that demonstrated inhibition ≥80% growth of S. Saprophyticus (Ss) and/or S. aureus (Sa) at <20 µM, and ≥80% inhibition against E. coli (Ec) and A. baumannii (Ab) at <30 µM. The MIC$_{80}$ (QM) and CC50 (QM) value was listed on the bottom of each compound and the target organisms are listed in the parenthesis as abbreviations. *67, Ciprofloxicin, positive control)

F. Synthesis of Compounds #149 and #154

Synthesis of #149: 4-[(4-bromophenyl)methyl]-1-hydroxy-1,8-naphthyridin-2-one hydrobromide Step 1: (1-Benzyloxy-2-oxo-1,8-naphthyridin-4-yl)trifluoromethanesulfonate (0.50 g) (WO 2008/010964 and Williams et al., 2010) was added to a 10-20 mL microwave vessel with THF (10 mL). The vessel was sparged with N$_2$ for 5 minutes and then tetrakis(triphenylphosphine)palladium(0) (72 mg) was added. The vessel was crimped shut and sparged again for 5 minutes using N$_2$. Bromo-[(4-bromophenyl)methyl]zinc (5 mL of a 0.5 M solution in THF) was added via syringe and the reaction was heated in a Biotage microwave at 110° C. for 10 minutes. The reaction was taken up in EtOAc and washed using saturated sodium bicarbonate and then saturated brine. The EtOAc layer was dried over sodium sulfate, filtered and evaporated to give 1.20 g of crude product as a yellow oil. The material was triturated using ~5 mL of MeCN and filtered to give product 1-benzyloxy-4-[(4-bromophenyl)methyl]-1,8-naphthyridin-2-one (283 mg; 53% yield) as a pale yellow solid. LC-MS m/z 421, 423 (M+H, bromo pattern).

Step 2: A round bottom flask was charged with 1-benzyloxy-4-[(4-bromophenyl)methyl]-1,8-naphthyridin-2-one (79 mg), 33% HBr in HOAc (1 mL) and water (0.3 mL). The reaction was heated to 80° C. for 2 hours. The reaction was cooled to room temperature and water was added. The precipitate was filtered, rinsed using additional water and dried under high vacuum overnight to give the final product 4-[(4-bromophenyl)methyl]-1-hydroxy-1,8-naphthyridin-2-one hydrobromide (50 mg; 64% yield) as a tan solid. LC-MS m/z 331, 333 (M+H, bromo pattern).

Synthesis of #154:
1-hydroxy-4-phenyl-1,8-naphthyridin-2-one

Step 1: To a 2-5 mL microwave vial was added (1-benzyloxy-2-oxo-1,8-naphthyridin-4-yl) trifluoromethanesulfonate (WO 2008/010964 and Williams et al., 2010) (250 mg) and anhydrous THF (5 mL). Phenylboronic acid (152 mg), cesium acetate (359 mg) and Pd(tetrakis)triphenylphosphine (36.1 mg) were added. The vessel was crimped and sparged with nitrogen for 10 minutes. The vessel was heated in a Biotage microwave at 90° C. for 25 minutes. The reaction was diluted in EtOAc and washed using water, then brine. The EtOAc layer was dried with sodium sulfate, filtered and evaporated to give the crude 1-benzyloxy-4-phenyl-1,8-naphthyridin-2-one as a yellow solid which was chromatographed on 40 g of silica (10% to 80% EtOAc/hexanes). A white solid was obtained after trituration with hexane: 1-benzyloxy-4-phenyl-1,8-naphthyridin-2-one (85 mg; 42% yield). LC-MS m/z 329 (M+H).

Step 2: HBr in HOAc (1.5 mL) was added to 1-phenoxy-4-phenyl-1,8-naphthyridin-2-one (86 mg). Water (0.3 mL) was added and the reaction was heated at 80-250° C. until LC-MS showed the disappearance of starting material. The reaction was evaporated and chromatographed on a 120 g C-18 column (10% to 60% MeCN/water with 0.05% TFA). Pure fractions were pooled, evaporated and lyophilized to give 1-hydroxy-4-phenyl-1,8-naphthyridin-2-one as off-white solid: 33.2 mg (51.5% yield). $^1$H NMR (400 MHz, DMSO-$d_6$) d ppm 11.10 (s, 1H), 8.72 (dd, J=4.5, 1.6 Hz, 1H), 7.88 (dd, J=7.8, 1.7 Hz, 1H), 7.49-7.61 (m, 5H), 7.33 (dd, J=8.1, 4.6 Hz, 1H), 6.71 (s, 1H). LC-MS m/z 239 (M+H).

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

VI. REFERENCES

The following references, to the extent that they provide exemplary procedural or other details supplementary to those set forth herein, are specifically incorporated herein by reference:

JP56025234
WO 2005/113508
WO 2005/113509
WO 2008/010964
Ariyoshi et al., *Cell* 78:1063-1072, 1994.
Beilhartz et al., *J. Mol. Biol.* 388:462-474, 2009.
Boucher et al., *Infectious Diseases Society of America. Clin Infect Dis.* 48:1-12, 2009.
Cai et al., *Antiviral Res.* 108:48-55, 2014.
Dyda et al., *Science* 266:1981-1986, 1994.
Egawa et al., *J. Heterocycl. Chem.,* 24(1):181-185, 1987.
Farias et al., *Antimicrob. Agents Chemother.* 55:4735-4741, 2011.
Grohe et al., *Liebigs Ann Chem.,* 1:29-37, 1987.
Hamana et al., *Chem. Pharm. Bull.,* 10:51-54, 1962.
Hu et al., *Antiviral Res.* 99:221-229, 2013.
Infectious Diseases Society of A Clin Infect Dis. 50:1081-1083, 2020.
Katayanagi et al., *Nature* 347:306-309, 1990.
Lomonosova et al., *Antimicrob Agents Chemother.* December 12. pii: AAC.02441-16, 2016.
Lu et al., *Antimicrob Agents Chemother. December;* 58(12):7451-61, 2014.
Masaoka et al., *Biochemistry,* 55(5):809-819, 2016.
Matsumoto et al., *J. Med. Chem.,* 18(1):74-79, 1975.
McCord et al., *J. Heterocycl Chem.,* 21(3):643-646, 1984.
Nowotny, *EMBO Rep.* 10:144-151, 2009.
Rice & Baker, *Nat Struct Biol.* 8:302-307, 2001.
Rice, *J Infect Dis.* 197:1079-81, 2008.
Sanchez et al., *J Med. Chem.,* 31(5):983-991, 1988.
Song et al., *Science* 305:1434-1437, 2004.
Tavis & Lomonosova, *Antiviral Research* 118. 132-138, 2015.
Tavis et al., *Antimicrob. Agents Chemother.* 58 pp. 7451-7461, 2014.
Tavis et al., *PLoS Pathog.* 9:e1003125, 2013.
Williams et al., *Bioorg. Med. Chem. Lett.,* 20(22):6754-6757, 2010.
Wuerthner et al., *J. Am. Chem. Soc.,* 123(12):2810-2824, 2001.

What is claimed is:

1. A method of treating a bacterial infection in a patient, the method comprising administering to the patient a therapeutically effective amount of a compound selected from:

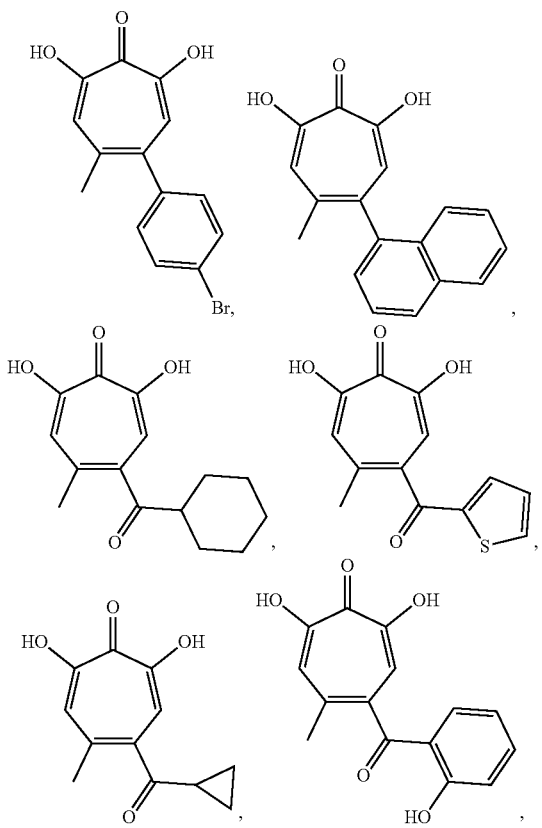

-continued

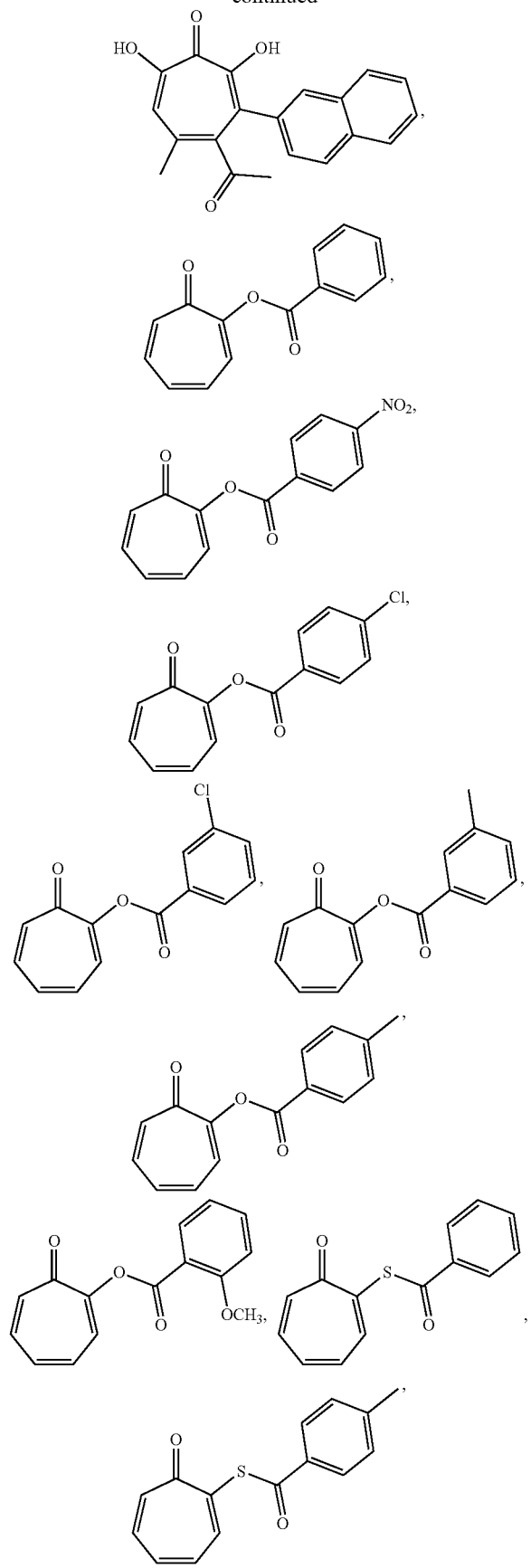

-continued

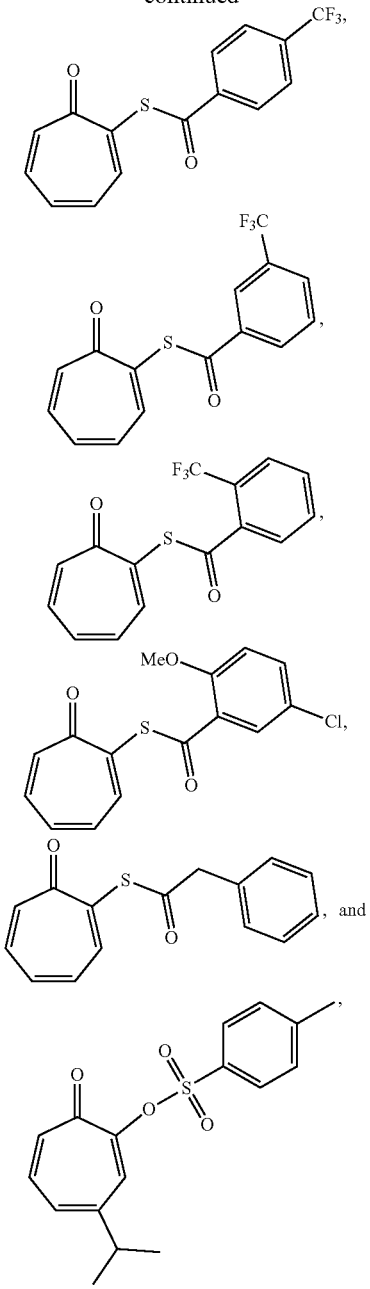

or a pharmaceutically acceptable salt or tautomer thereof, wherein the bacterial infection is caused by a bacterium comprising a peptidoglycan in its cell wall.

2. The method of claim 1, wherein the bacterium is a gram-positive bacterium.

3. The method of claim 2, wherein the bacterium is gram-positive bacterium and is resistant to cefoxitin, oxacillin, gentamicin, ciprofloxacin, levofloxacin, moxifloxacin, erythromycin, clindamycin, linezolid, daptomycin, vancomycin, doxycycline, tetracycline, tigecycline, nitrofurantoin, rifampin, or trimethoprim-sulfamethoxazole.

4. The method of claim 1, wherein the bacterium is a gram-negative bacterium.

5. The method of claim 4, wherein the bacterium is a gram-negative bacterium and is resistant to amoxicillin-clavulanic acid, ampicillin-sulbactam, piperacillin-tazobactam, cefepime, ertapenem, imipenem, mereopenem, gentamicin, tobramycin, ciprofloxacin, levofloxacin, nitrofurantoin, or trimethoprim-sulfa methoxazole.

6. The method of claim 1, wherein the bacterium is *Staphlococcus saprophyticus* (*S. saprophyticus*), *Staphlococcus aureus* (*S. aureus*), methicillin-resistant *Staphylococcus aureus* (MRSA), coagulase negative *staphylococcus* (CNS), methicillin-resistant CNS (MRCNS), *E. coli*, multi-drug resistance (MDR) *E. coli*, MDR-*Citrobacter koseri*, MDR-*Enterobacter cloacae* complex, MDR-*Morganella morganii*, MDR-*Klebsiella pneumonia*, or MDR-*Acinetobacter baumannii*.

7. The method of claim 1, wherein the compound is selected from:

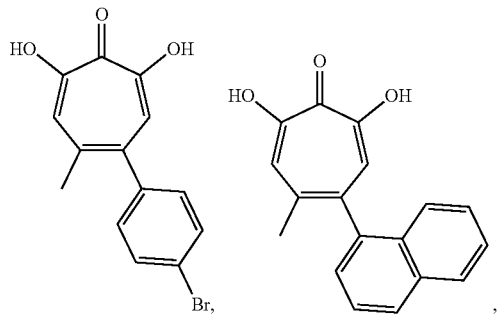

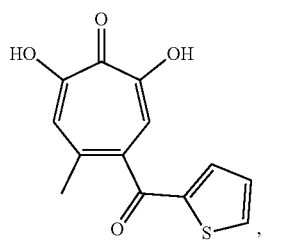

or a pharmaceutically acceptable salt or tautomer thereof.

8. The method of claim 1, wherein the compound is selected from:

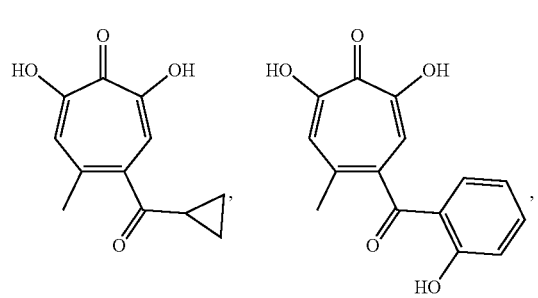

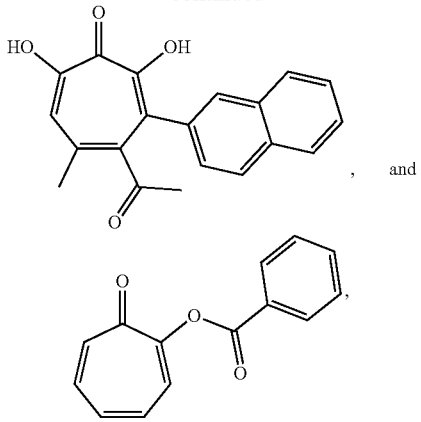

or a pharmaceutically acceptable salt or tautomer thereof.

9. The method of claim 1, wherein the compound is selected from:

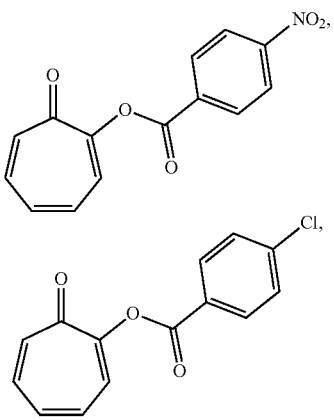

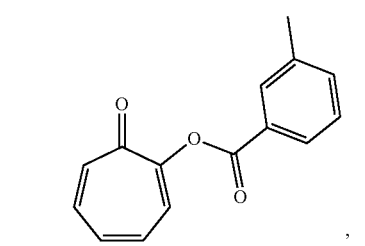

or a pharmaceutically acceptable salt or tautomer thereof.

10. The method of claim 1, wherein the compound is selected from:

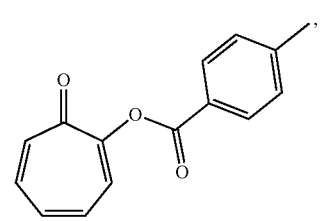
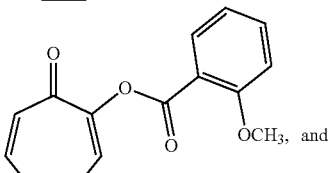
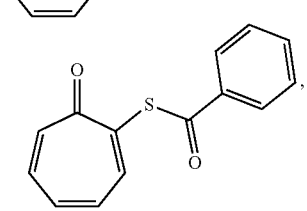
or a pharmaceutically acceptable salt or tautomer thereof.
11. The method of claim 1, wherein the compound is selected from:
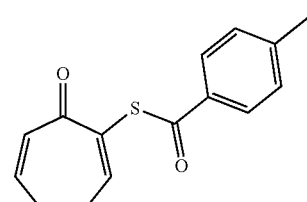
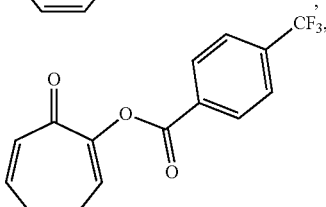
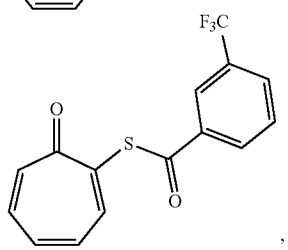
, and
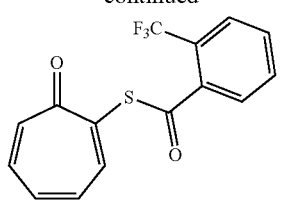
,
or a pharmaceutically acceptable salt or tautomer thereof.
12. The method of claim 1, wherein the compound is selected from:
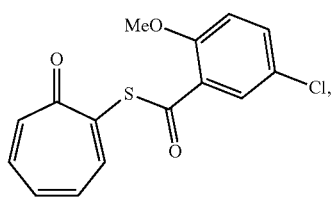
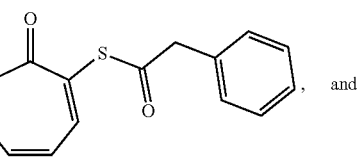
, and
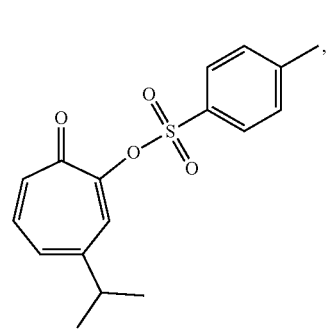
or a pharmaceutically acceptable salt or tautomer thereof.
* * * * *

UNITED STATES PATENT AND TRADEMARK OFFICE
CERTIFICATE OF CORRECTION

PATENT NO. : 12,502,362 B2
APPLICATION NO. : 16/614335
DATED : December 23, 2025
INVENTOR(S) : Feng Cao et al.

Page 1 of 1

It is certified that error appears in the above-identified patent and that said Letters Patent is hereby corrected as shown below:

On the Title Page

Item (57), Abstract, page 2, Line 1, after "-continued", delete:

"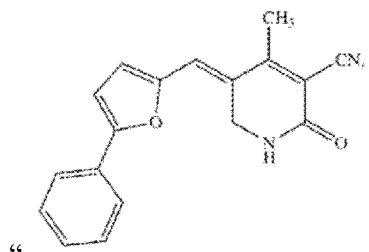 (IV)"

And insert:

-- 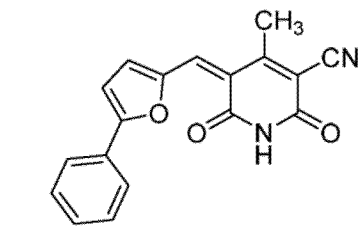 (IV) -- therefor.

Signed and Sealed this
Twenty-seventh Day of January, 2026

John A. Squires
*Director of the United States Patent and Trademark Office*